US008879132B2

(12) United States Patent
Naono

(10) Patent No.: US 8,879,132 B2
(45) Date of Patent: Nov. 4, 2014

(54) MIRROR DRIVING APPARATUS, METHOD OF DRIVING SAME AND METHOD OF MANUFACTURING SAME

(75) Inventor: Takayuki Naono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 23 days.

(21) Appl. No.: 13/608,901

(22) Filed: Sep. 10, 2012

(65) Prior Publication Data

US 2013/0063800 A1   Mar. 14, 2013

(30) Foreign Application Priority Data

Sep. 8, 2011   (JP) .................................. 2011-196295

(51) Int. Cl.
*G02B 26/08* (2006.01)

(52) U.S. Cl.
CPC ............ *G02B 26/0858* (2013.01); *G02B 26/08* (2013.01)
USPC .................. 359/200.8; 359/196.1; 359/197.1; 359/200.7

(58) Field of Classification Search
CPC .................................................. G02B 26/0858
USPC ............................................ 359/200.7, 200.8
See application file for complete search history.

(56) References Cited

U.S. PATENT DOCUMENTS

| 7,605,965 | B2 | 10/2009 | Tani et al. | |
|---|---|---|---|---|
| 7,605,966 | B2 | 10/2009 | Tani et al. | |
| 7,773,282 | B2 | 8/2010 | Tani et al. | |
| 2008/0225363 | A1* | 9/2008 | Saitoh et al. | 359/199 |
| 2009/0180167 | A1* | 7/2009 | Tani et al. | 359/198.1 |
| 2009/0185253 | A1* | 7/2009 | Tani et al. | 359/221.2 |
| 2009/0323151 | A1* | 12/2009 | Tani et al. | 359/221.2 |
| 2010/0014143 | A1* | 1/2010 | Kanno et al. | 359/224.1 |

FOREIGN PATENT DOCUMENTS

| JP | 2005-177876 A | 7/2005 |
|---|---|---|
| JP | 2008-257226 A | 10/2008 |
| JP | 2009-169089 A | 7/2009 |

OTHER PUBLICATIONS

Masanao Tani et al.; "A Two-Axis Piezoelectric Tilting Micromirror with a Newly Developed PZT-Meandering Actuator"; MicroElectro Mechanical Systems, 2007; MEMS. IEEE 20th International Conference (2007); pp. 699-702.

\* cited by examiner

*Primary Examiner* — Ricky Mack
*Assistant Examiner* — William Alexander
(74) *Attorney, Agent, or Firm* — Studebaker & Brackett PC

(57) ABSTRACT

An aspect of the present invention provides a mirror driving apparatus, including: a mirror section having a reflecting surface which reflects light; a pair of piezoelectric actuator sections arranged on either side of the mirror section; coupling sections which respectively connect one end of each of the piezoelectric actuator sections to an end portion of the mirror section which is distant from an axis of rotation of the mirror section in a direction along the reflecting surface and perpendicular to the axis of rotation; a fixing section which supports another end of each of the piezoelectric actuator sections; and a perpendicular movement suppressing structure which suppresses translational motion of the axis of rotation of the mirror section in a direction perpendicular to the reflecting surface, one end of the perpendicular movement suppressing structure being connected to the fixing section and another end thereof being connected to the mirror section.

21 Claims, 16 Drawing Sheets

|  | MIRROR TILT ANGLE | fx(Hz) | fy(Hz) |
|---|---|---|---|
| PRACTICAL EXAMPLE 1 | ±22° | 198 | 2100 |
| PRACTICAL EXAMPLE 2 | ±22° | 180 | 500 |
| COMPARATIVE EXAMPLE 1 | ±2.5° | 200 | 98 |
| COMPARATIVE EXAMPLE 2 | ±25° | 190 | 200 |

A: COUPLE COMPONENT REQUIRED FOR TWISTING
B: TENSILE COMPONENT UNRELATED TO TWISTING

MIRROR DRIVING APPARATUS, METHOD OF DRIVING SAME AND METHOD OF MANUFACTURING SAME

BACKGROUND OF THE INVENTION

1. Field of the Invention

The present invention relates to a mirror driving apparatus, and in particular, to a structure of a micro mirror device suitable for an optical deflector used in light scanning, a method of driving such a micro mirror device, and technology for manufacturing the same.

2. Description of the Related Art

Characteristic features of a micro scanner which is manufactured using silicon (Si) fine processing technology (hereinafter, called a "MEMS (Micro Electro Mechanical System) scanner") are its compact size and reduced power consumption compared to a polygon mirror which is a conventional light scanning module. Therefore, a MEMS scanner is expected to have a broad range of application from laser projectors to optical diagnostic scanners such as an optical coherence tomograph (OCT), or the like.

There are various methods of driving a MEMS scanner, but of these, a piezoelectric drive method using deformation of a piezoelectric body is promising as a method for obtaining a large scanning angle with a compact system, since this method has large torque but involves a simple device structure and a simple drive circuit. The structure of a general piezoelectric micro mirror (piezoelectric MEMS scanner) is described below.

<Structure of Torsion Bar>

A general piezoelectric MEMS scanner often employs a structure in which a torsion bar aligned with the rotational axis is connected to a mirror, and the torsion bar is twisted by a plurality of piezoelectric cantilevers (see Japanese Patent Application Publication Nos. 2008-257226, 2009-169089 and 2005-177876). FIG. 14 shows the structure depicted in "FIG. 7" of Japanese Patent Application Publication No. 2008-257226. Reference numeral 01 in FIG. 14 is a mirror section, 02a and 02b are torsion bars, and 03a to 03d are piezoelectric cantilevers.

FIG. 15 shows a schematic cross-sectional diagram of a torsion bar in FIG. 14 viewed in the axial direction. Here, the torsion bar labeled with reference numeral 02b is shown, but the same applies to the other torsion bar 02a. As shown in FIG. 15, in this structure, two piezoelectric cantilevers 03b, 03d disposed on either side of the torsion bar 02b are driven so as to be displaced respectively in opposite up/down directions and to twist the torsion bar 02b.

A torsion bar driving method has a problem in that not all of the force produced by the piezoelectric cantilevers is used to rotate the mirror and hence the use efficiency of the force is poor. In other words, the pure torque for twisting the torsion bar which twists about a certain axis of rotation is produced by a couple about a twisting axis (a vector component in the A direction). However, in the twisting movement produced by the piezoelectric cantilevers 03b, 03d such as those shown in FIG. 15, as the amount of displacement of the to cantilevers increases, so the direction of action of the force moves away from the couple about the twisting axis.

The couple component required in order to twist the torsion bar 02b is the vector direction indicated by A in FIG. 15. This couple component in direction A is obtained as the A-direction component of the cantilever force (the vector indicated by C in FIG. 15). The cantilever force (C-direction vector) is the direction in which the front end portion of the lever bends, in other words, a direction perpendicular to the surface of the front end portion, and therefore the greater the displacement of the cantilever, the smaller the couple component (A-direction component) which contributes to twisting of the torsion bar, and the greater the component of the surplus force which is unrelated to twisting (the component in the pulling direction indicated by B in FIG. 15). Hence, there is a drawback in that even if a large bending displacement is obtained in the piezoelectric cantilevers, this displacement cannot be reflected efficiently in the amount of twisting of the torsion bar, in other words, the amount of tilt of the mirror section.

As stated previously, in a torsion bar structure, when the torsion bar is twisted by piezoelectric cantilevers, a force pulling in a direction perpendicular to the axis of rotation (a B-direction vector component) is generated, and this force produces a dynamic energy loss and leads to decline in the angle of rotation. Since this energy loss becomes greater, the higher the angle of rotation, then it is extremely difficult to achieve a large angle of rotation with a structure based on a torsion bar.

<Bending Hinge Structure>

A MEMS scanner device 410 having a structure such as that shown in FIG. 16 is considered to be a solution for the aforementioned problems of a torsion bar structure. This structure is one in which piezoelectric cantilevers 414 are connected to end portions 412A of a rectangular mirror section 412 via thin plate coupling sections 416. Base end portions 414B of the piezoelectric cantilevers 414 are fixed to a fixing section 430 which forms a fixing and supporting member. By causing the end portions 412A of the mirror section 412 to oscillate up and down by upward and downward driving of the piezoelectric cantilevers 414, a tilting motion is induced in the mirror section 412 due to an inertial force. A structure of this kind is called a "bending hinge structure".

The bending hinge structure induces resonance in the direction of tilt (rotation) by oscillation of the end portions 412A of the mirror section 412, and tilts the mirror by this resonating oscillation. By providing spiral-shaped coupling sections (hinges which are bent in a meandering shape) 416 between the mirror sections 412 and the piezoelectric cantilevers 414, the displacement of the tilt angle of the mirror sections 412 is further increased. However, the spiral-shaped (meandering) coupling sections 416 are not an indispensable element and it is also possible to adopt a composition in which the piezoelectric cantilevers are connected directly to the end portions of the mirror section 412.

FIG. 17 shows a schematic drawing of movement based on a bending hinge structure. In FIG. 17, in order to simplify the description, a composition is shown in which piezoelectric cantilevers 414 are connected directly to the end portions of the mirror section 412. In FIG. 17, the direction of acceleration of the piezoelectric cantilevers 414 (the direction in which force is applied) is the downward direction indicated by arrow D, and the direction in which the inertial force applied to the mirror section 412 acts is the opposite direction (the direction of arrow E). In other words, this inertial force coincides completely with the direction in which the mirror section 412 is tilted, and no surplus force component is generated. Therefore, the force generated by the piezoelectric cantilevers 414 is used efficiently as a force for tilting the mirror section 412.

In this hinge bending structure, when the piezoelectric cantilevers 414 are driven at the resonance frequency of the rotational motion of the mirror, as shown in FIG. 18, the hinges (coupling sections 416) bend with the displacement of the cantilevers, and a rotational motion resonance of the mirror section 412 is induced due to the generation of an inertial torque in the mirror section 412.

As illustrated in FIG. 17, the direction of displacement of the piezoelectric cantilevers 414 substantially coincides with the direction of rotation of the mirror section 412 at all times, and all of the force is used to rotate the mirror. Therefore, the use efficiency of this force is clearly better than a torsion bar structure, and even if the angle of rotation is large, a large displacement is obtained since there is little energy loss. Furthermore, if meandering coupling sections 416 such as those shown in FIG. 16 are employed in the coupling sections between the mirror section 412 and the piezoelectric cantilevers 414, then the plurality of bending hinges in the meandering shape bend little by little, thereby accumulating displacement, and hence a merit is obtained in that little stress is applied to each individual hinge and the coupling sections are not liable to break, even with a high angle of rotation.

<Meandering Piezoelectric Cantilever Structure>

The structure proposed by M. Tani, M. Akamatsu, Y. Yasuda, H. Toshiyoshi, in 'A two-axis piezoelectric tilting micro mirror with a newly developed PZT-meandering actuator' in 'MicroElectro Mechanical Systems, 2007. MEMS. IEEE 20th International Conference (2007), pp. 699-702, is a structure which is close to the bending hinge structure described above. However, this structure does not employ resonance driving, but rather the cantilevers themselves are formed in a meandering shape folded in a plurality of layers and are disposed on either side of a mirror. In this method, the displacement is increased by adopting a folding structure for the piezoelectric cantilevers and driving the cantilevers so as to induce alternating bending in opposite directions, whereby the mirror can be tilted by a large amount even without using resonance.

SUMMARY OF THE INVENTION

As stated previously, a bending hinge structure or a meandering piezoelectric cantilever structure transmits force more efficiently than a torsion bar structure, and hence has a merit in that a larger displacement can be obtained. However, these structures have a drawback in that translational motion is liable to occur in a direction perpendicular to the reflective surface of the mirror, as shown in FIG. 19. More specifically, the drawbacks can be summarized in view of the following two points.

(1) For structural reasons, the spring constant of the translational motion in the direction perpendicular to the mirror surface is small and the resonance frequency is low, and therefore resonance of the translational motion is readily excited by ambient vibrations.

(2) For structural reasons, the resonance frequencies of the rotational motion and the translational motion of the mirror are very close to each other, and therefore if rotational motion is driven by resonance, then resonance also occurs in the direction of translational motion due to this driving oscillation.

These problems become more pronounced if the bending hinges are made flexible, or the number of folds of the piezoelectric cantilevers is increased, in order to increase the angle of rotation. When the mirror performs a translational motion in the perpendicular direction during driving, then this gives rise to variation in the optical path length of the scanner, deviation in the focal point, positional deviation of the light spot, and the like, and hence this is a critical problem in relation to practical use.

Moreover, a bending hinge structure or a meandering piezoelectric cantilever structure is also problematic in that since there is no structure which maintains the axis of rotation of the mirror, such as a torsion bar, then the center of rotation does not coincide with the center of the mirror.

The present invention was devised in view of these circumstances, an object thereof being to provide a mirror driving apparatus, a method of driving same and a method of manufacturing same, whereby a large displacement can be obtained in the direction of rotation of a mirror by efficiently using the force of a piezoelectric actuator, as well as being able substantially to suppress translational motion of the mirror in a perpendicular direction.

In order to achieve the aforementioned object, the mirror driving apparatus relating to the present invention comprises: a mirror section having a reflecting surface which reflects light; a pair of piezoelectric actuator sections arranged on either side of the mirror section; coupling sections which respectively connect one end of each of the piezoelectric actuator sections to an end portion of the mirror section which is distant from an axis of rotation of the mirror section in a direction along the reflecting surface and perpendicular to the axis of rotation; a fixing section which supports another end of each of the piezoelectric actuator sections; and a perpendicular movement suppressing structure which suppresses translational motion of the axis of rotation of the mirror section in a direction perpendicular to the reflecting surface, one end of the perpendicular movement suppressing structure being connected to the fixing section and another end thereof being connected to the mirror section.

According to this invention, one end of each piezoelectric actuator section is connected to an end of the mirror section via a coupling section, and the other end thereof is fixed and supported on a fixing section. The ends of the mirror section oscillate via the coupling sections when the piezoelectric actuator sections are driven, thereby applying a rotational torque to the mirror section. By this means, the mirror section is caused to perform a rotational motion about the axis of rotation and the reflecting surface is tilted.

Since the direction of the forces produced by the bending displacement of the piezoelectric actuator sections substantially coincides with the direction in which the mirror section is rotated, then it is possible to use the force generated by the piezoelectric actuator sections effectively for rotational motion, and a large angle of rotation (mirror tilt angle) can be obtained. Furthermore, since the mirror section is connected to the fixing section via a perpendicular movement suppressing structure, then translational motion of the mirror section in the perpendicular direction is suppressed.

Further modes of the invention will become apparent from the description of the specification and the drawings.

According to the present invention, the force of piezoelectric actuator sections is used efficiently and a mirror section can be caused to perform a rotational motion through a large angle of rotation, as well as being able greatly to suppress translational motion of the mirror section in the perpendicular direction.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

First Embodiment

Figure 1:
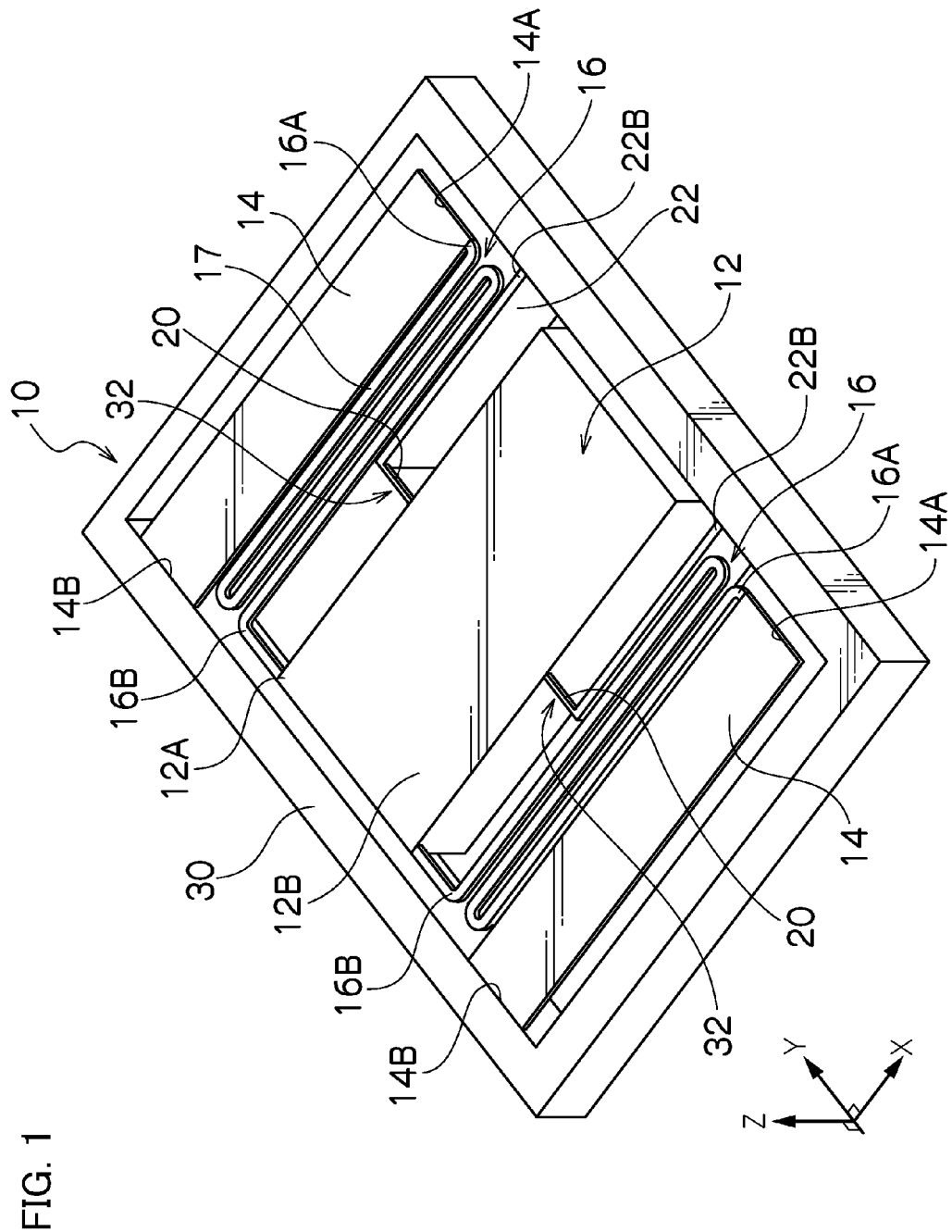
FIG. 1 is a perspective diagram of a MEMS scanner device relating to a first embodiment.
Figure 2:
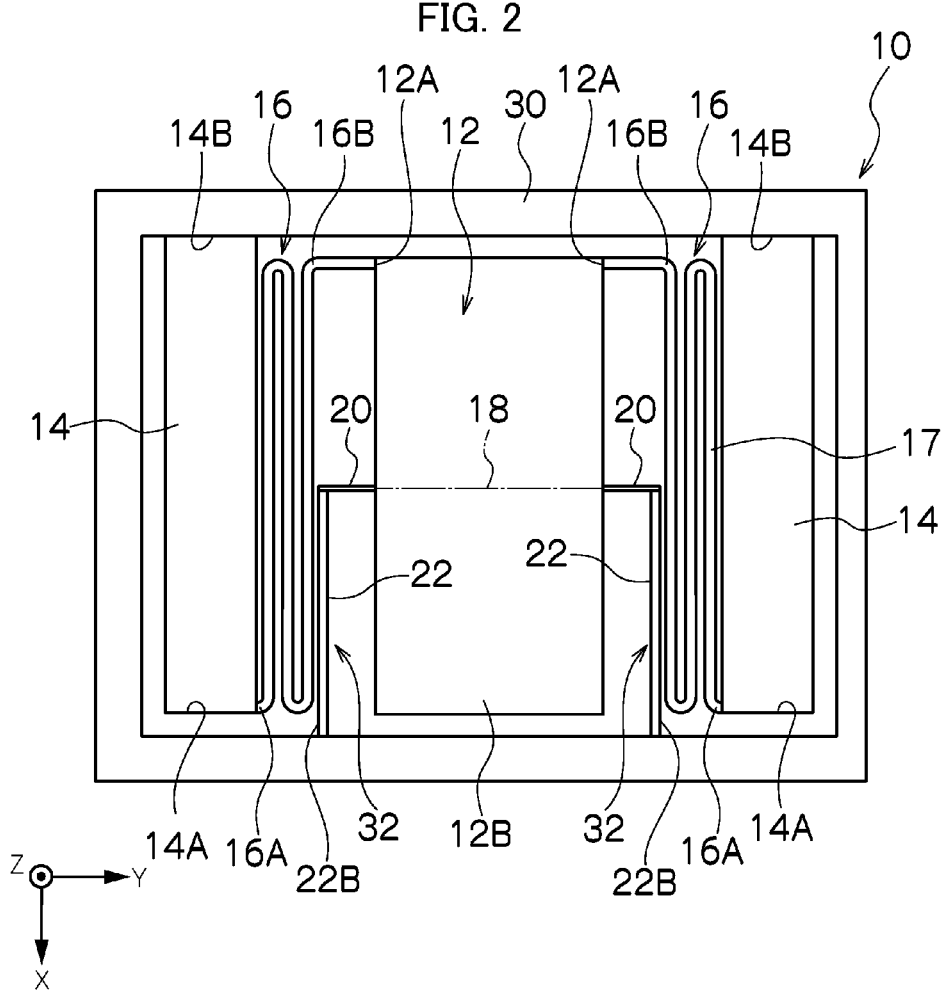
FIG. 2 is a plan diagram of a MEMS scanner device in FIG. 1 as viewed from the side of the reflecting surface of the mirror section.

FIG. 1 is a perspective diagram of a MEMS scanner device relating to a first embodiment, and FIG. 2 is a plan diagram (upper surface diagram) viewed from the surface opposite to the mirror section. As shown in FIG. 1 and FIG. 2, the MEMS scanner device 10 according to the present embodiment includes: a mirror section 12; a pair of piezoelectric actuator sections 14 which are disposed on either side of the mirror section 12; coupling sections 16 which connect one end (14A) of each piezoelectric actuator section 14 to an end portion 12A of the mirror section 12; torsion bars 20 which are connected to the mirror section 12 at positions substantially coinciding with the axis of rotation 18 of the mirror section 12; torsion bar supporting sections 22 which each support one end of the torsion bars 20; and a fixing section 30 which fixes and supports base ends 14B of the piezoelectric actuator sections 14 and base ends 22B of the torsion bar supporting sections 22.

In order to raise a reflectivity of the incident light, a metal thin film of Au (gold), Al (aluminum) or the like, is formed on an upper surface of the mirror section 12 (reference numeral 12B) which is a light reflecting surface. There are no particular restrictions on the material and film thickness used in the mirror coating, and various designs are possible using commonly known mirror materials (high-reflectivity materials).

In the present embodiment, a mirror section 12 having a substantially rectangular reflecting surface 12B is shown by way of an example, and the description relates to orthogonal xyz axes, namely, the long edge direction of the reflecting surface 12B when not driving is taken as the x direction, the short edge direction perpendicular to this is taken as the y direction, and the direction perpendicular to the xy plane is taken as the z direction. In implementing the present invention, there are no particular restrictions on the shape of the mirror section 12. This shape is not limited to a rectangular shape as shown in FIG. 1 and FIG. 2, and it is possible to adopt various shapes, such as a square shape, polygonal shape, circular shape or elliptical shape, or the like.

In the MEMS scanner device 10, the pair of piezoelectric actuator sections 14 are disposed so as to sandwich, from either side in the y direction, the mirror section 12 of which the reflecting surface 12B faces in the z direction when not driven. The piezoelectric actuator sections 14 are actuators of a piezoelectric unimorph cantilever structure (see FIG. 3), and perform a bending displacement due to deformation of a piezoelectric body. In other words, one end portion of the piezoelectric actuator section 14 in the x direction (the base end 14B) is fixed and supported on the fixing section 30, whereas the opposite end portion 14A is not fixed to the fixing section 30 but rather is an unconstrained end which can be displaced by the cantilever structure.

The unconstrained side 14A of each piezoelectric actuator section 14 is connected to one end 16A of a coupling section 16 which is composed in a meandering shape. The other end 16B of the coupling section 16 is connected to one end portion 12A of the mirror section 12 in the lengthwise direction (x axis direction).

The end portion 12A in the lengthwise direction of the mirror section 12 to which the coupling section 16 is connected does not have to be at the endmost position in the strictest sense, but rather includes a portion within a range generally interpreted as an end portion (the endmost position and the periphery thereof). The coupling sections 16 are connected to the vicinity of the end portions of the mirror section 12 which are distanced in the x axis direction from the axis of rotation 18, in such a manner that by displacing the piezoelectric actuator sections 14 which are respectively connected to the mirror section 12 via the coupling sections 16, a rotational torque is applied to the mirror section 12 and an action of causing the mirror section 12 to perform a rotational motion about the axis of rotation 18 can be achieved.

The coupling sections 16 each have a structure in which a plurality of flat bar-shaped thin plate members 17 having a lengthwise direction in the x axis direction of the mirror section 12 are arranged so as to be folded back in a meandering shape. FIG. 2 shows a composition where the three thin plate members 17 are arranged in parallel fashion and the end portions of the thin plate members 17 are connected together in a folded meandering shape, but a suitable number of thin plate members 17, which is no less than one, may be employed.

The torsion bars 20 are connected to the mirror section 12 at positions which coincide with the axis of rotation 18, and extend along the direction of the axis of rotation 18, outwards from the mirror section 12. Here, an example is shown in which the torsion bars 20 are connected to the mirror section 12 at positions which coincide with the axis of rotation 18, but the connection positions of the torsion bars 20 do not have to coincide precisely with the axis of rotation 18, and furthermore, the torsion bars 20 are not limited to being connected at one location only, and may also be connected in a plurality of locations.

For example, if the substantially central portion of the lengthwise direction of the mirror section 12 (the peripheral region of the center and not necessarily the true central point of the design) is taken as the axis of rotation 18, then apart from a mode where torsion bars are connected at one location in a position substantially matching the axis of rotation 18 and these torsion bars are supported, it is also possible to adopt a structure in which torsion bars are connected at two or more positions in axial symmetry with respect to the position of the axis of rotation 18, within a range interpreted as the substantially central portion.

The torsion bar supporting sections 22 have a similar thickness to the fixing section 30, and are members which respectively fix and support one end of a torsion bar 20. A combination of a torsion bar 20 and a torsion bar supporting section 22 functions as a perpendicular translational motion suppressing section 32 (corresponding to a "perpendicular movement suppressing structure") which suppresses z-direction translational motion of the mirror section 12. As shown in FIG. 2, the perpendicular translational motion suppressing sections 32 are arranged between the mirror section 12 and the meandering coupling sections 16, when observed in plan view.

In the MEMS scanner device 10, respective elements, namely, the torsion bars 20, the torsion bar supporting sections 22, the coupling sections 16 and the piezoelectric actuator sections 14 are arranged in a linearly symmetrical structure about the mirror section 12. By means of this symmetrical structure, it is possible to apply a rotational torque efficiently to the centrally positioned mirror section 12.

Although the details are described hereinafter, rotational motion of the mirror section 12 about the axis of rotation 18 which is parallel to the y axis direction is induced by driving the pair of piezoelectric actuator sections 14, thereby tilting the reflecting surface 12B. Furthermore, translational motion of the mirror section 12 in the z direction (perpendicular direction) is suppressed by the torsion bars 20 and the torsion bar supporting sections 22.

The MEMS scanner device 10 which is composed in this way can be fabricated as a structure in which the respective elements, such as the fixing section 30, the mirror section 12, the piezoelectric actuator sections 14, the coupling sections 16, the torsion bars 20 and the torsion bar supporting sections 22, are composed in an integrated fashion, by processing a silicon substrate using a semiconductor manufacturing technology.

The piezoelectric actuator sections 14, the meandering coupling sections 16 and the torsion bars 20 are formed with a smaller thickness (in the z direction) than the fixing section 30 and the torsion bar supporting sections 22 which function as fixing and supporting members. By this means, a structure is obtained in which the piezoelectric actuator sections 14, the meandering coupling sections 16 and the torsion bars 20 can deform readily (to perform bending deformation or twisting deformation).

Figure 3:
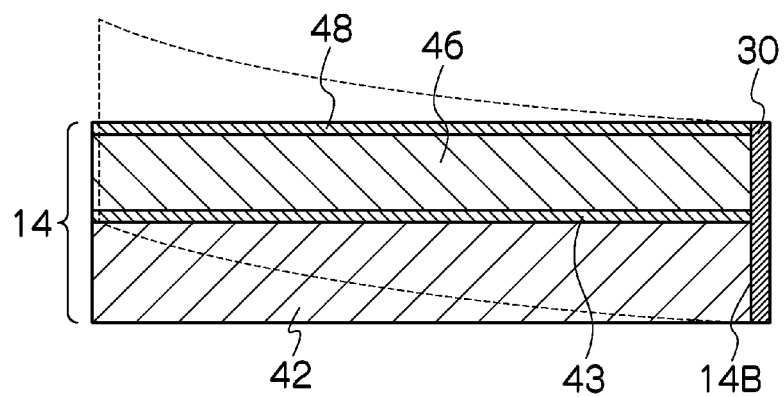
FIG. 3 is a cross-sectional diagram of a piezoelectric actuator section (cantilever section)

FIG. 3 is a schematic drawing showing a cross-sectional structure of a piezoelectric actuator section 14 consisting of a piezoelectric unimorph cantilever structure. In implementing the present invention, it is also possible to use a structure other than a unimorph cantilever as the piezoelectric actuator. For instance, it is possible to use a bimorph cantilever in which an electrode is sandwiched between two layers of piezoelectric body.

As shown in FIG. 3, the piezoelectric actuator sections 14 each have a structure in which a lower electrode 43, a piezoelectric body 46 and an upper electrode 48 are layered on a diaphragm 42. A layered structure of this kind is obtained by sequentially forming the respective layers of the lower electrode 43, the piezoelectric body 46 and the upper electrode 48 on a silicon (Si) substrate, for example. The right end in FIG. 3 is a fixed end which is supported on the fixing section 30 (see FIG. 1 and FIG. 2).

In the composition shown in FIG. 3, the piezoelectric body 46 is deformed by applying a drive voltage between the electrodes (43, 48) and due to this deformation, the diaphragm 42 twists and the lever portion moves up and down. The dotted lines in FIG. 3 indicate a state where the lever portion has been displaced upwards.

<Method of Supplying Drive Voltage>

The first embodiment displaces the piezoelectric actuator sections 14 on both sides of the mirror section 12 by applying the same drive voltage simultaneously to a pair of piezoelectric actuator sections 14. Therefore, it is possible to use a common (the same) drive circuit and control circuit as a power supply source for supplying drive power to the pair of piezoelectric actuator sections 14. As the drive waveform which is supplied to the piezoelectric actuator section 14, it is possible to use an AC signal or a pulse waveform signal of a frequency which excites resonance.

<Operation of MEMS Scanner Device 10>

The MEMS scanner device 10 relating to the first embodiment operates as described below.

When the same drive voltage is applied simultaneously to the pair of piezoelectric actuator sections 14 from the drive control circuit (not illustrated), the piezoelectric actuator sections 14 are displaced and the meandering coupling sections 16 connected thereto are caused to bend and deform. The end portions 12A of the mirror section 12 which are connected to the coupling sections 16 are displaced in the up/down direction (Z direction). By this movement, a rotational torque is applied to the mirror section 12, which performs a rotational motion about the axis of rotation 18.

For example, by applying a sinusoidal drive voltage to the piezoelectric actuator sections 14, the piezoelectric actuator sections 14 are caused to oscillate upwards and downwards, thereby imparting a rotational motion to the mirror section 12. By applying a drive voltage of a frequency close to the resonance frequency, so as to achieve resonance driving, the mirror section 12 is caused to oscillate with a large tilt angle. The meandering coupling sections 16 readily perform bending deformation, and therefore are beneficial for obtaining a large displacement in resonance driving (see FIG. 4). The frequency of the drive voltage applied to the piezoelectric actuator sections 14 does not particularly have to coincide precisely with the mechanical resonance frequency of the structure. A differential in the frequency of the drive voltage is allowable, within a range that excites resonance.

On the other hand, the torsion bars 20 which hold substantially the central portion of the mirror section 12 in the lengthwise direction (in the vicinity of the axis of rotation 18) are liable to twist in response to a rotational motion of the mirror section 12, but if the mirror section 12 seeks to perform translational movement in the perpendicular direction (Z direction), then the torsion bars 20 display a strong force of repulsion and serve to inhibit (suppress) the translational motion of the mirror section 12. In other words, the perpendicular translational motion suppressing sections 32 constituted by the torsion bars 20 and the torsion bar supporting sections 22 have an action of supporting the axis of rotation 18 of the mirror section 12 in a fixed position, whereby perpendicular translational motion of the mirror section 12 (translational movement in the Z direction) is suppressed (see FIG. 5).

Figure 4:
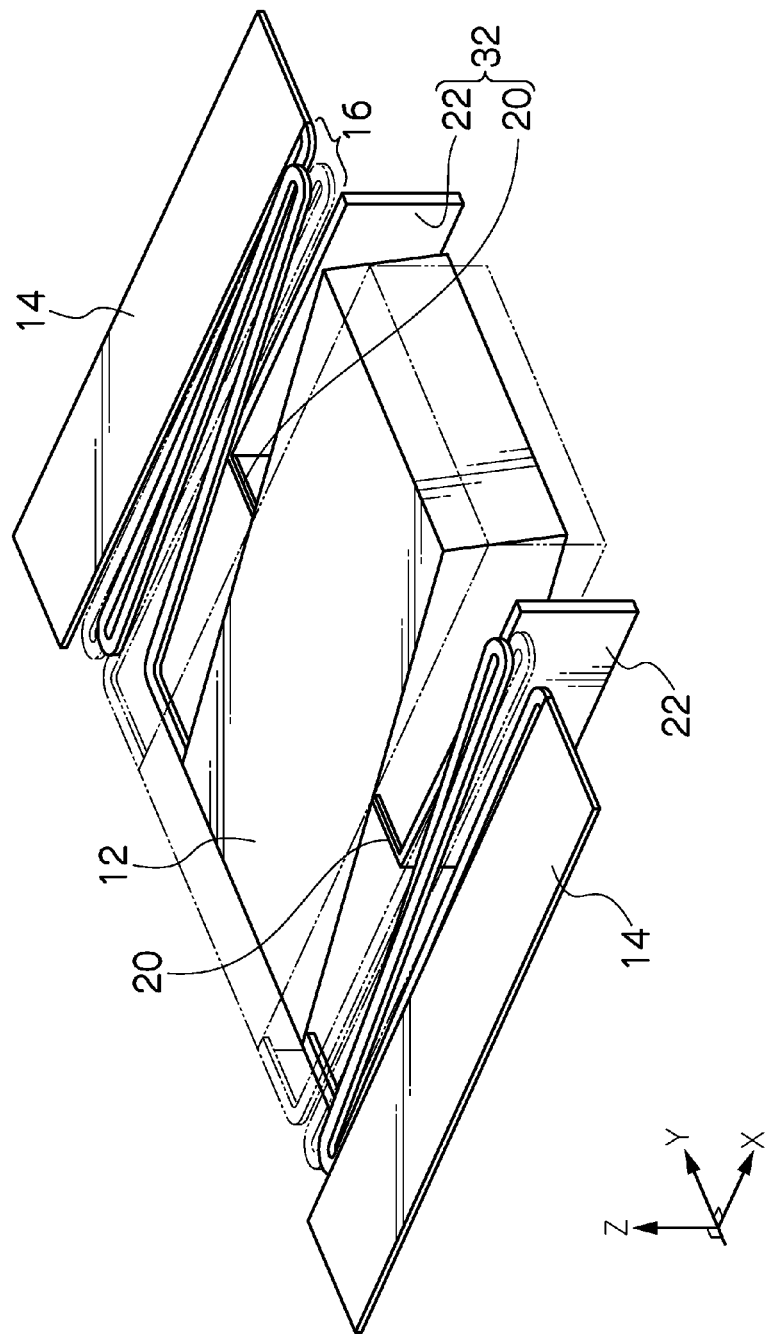
FIG. 4 is a perspective diagram for describing movement in a rotational mode in the case of resonance driving.
Figure 5:
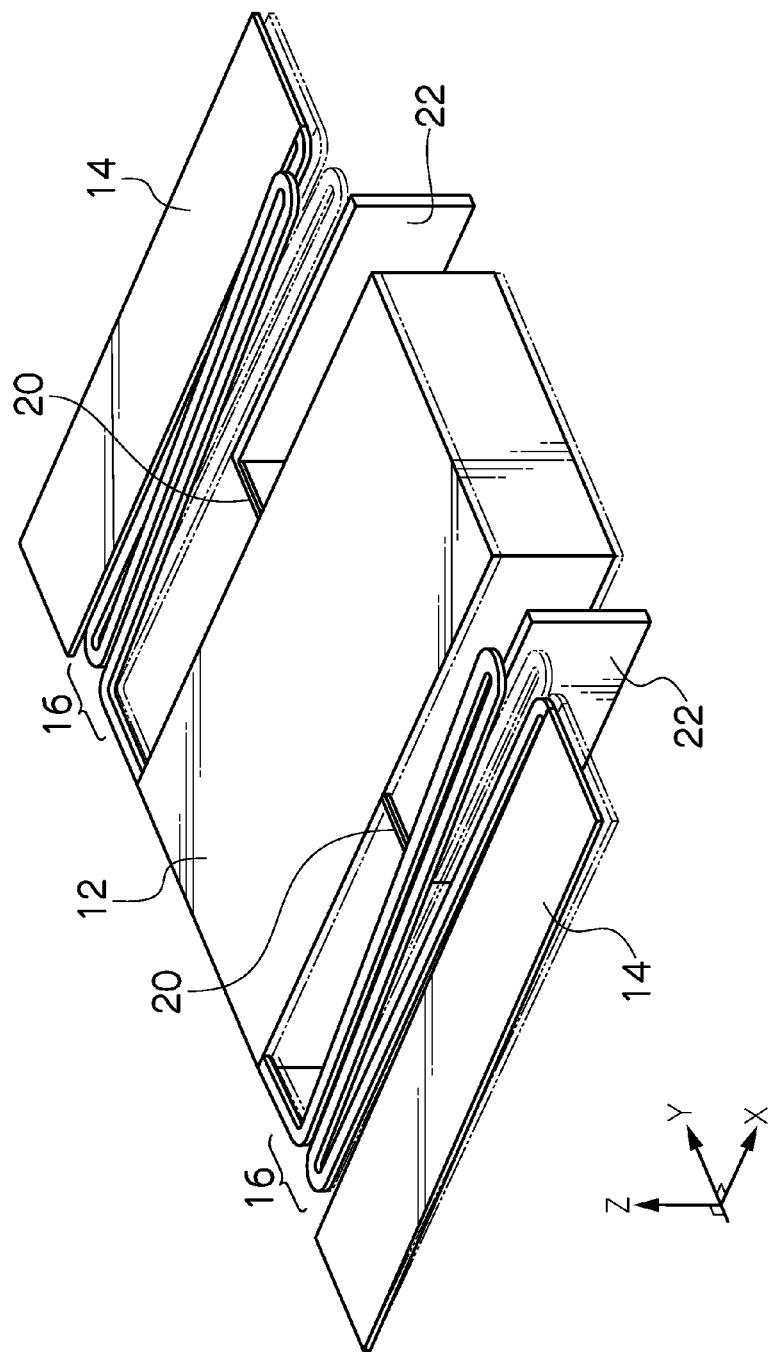
FIG. 5 is a perspective diagram for describing movement in a translational mode.

FIG. 4 is a perspective diagram showing a state of driving in a rotational resonance mode and FIG. 5 is a perspective diagram showing movement in a translational mode. In FIG. 4 and FIG. 5, the fixing section 30 is omitted from the illustration. As shown in FIG. 4, the mirror section 12 can be displaced through a large angle of rotation by the rotational resonance driving. On the other hand, in the translational mode, the motion of the mirror section 12 in the Z direction is suppressed by the action of the torsion bars 20 and the torsion bar supporting sections 22.

As stated above, the centrally positioned mirror section 12 is caused to swing about an axis of rotation 18 parallel to the Y axis direction in accordance with the driving of the piezoelectric actuator sections 14. The light incident on the mirror section 12 (for example, the laser light emitted from the laser light source (not illustrated)) is reflected in accordance with the tilt (angle) of the mirror section 12, thereby changing the direction of travel of the reflected light (the irradiation position of the reflected light). According to the MEMS scanner device 10 relating to the present embodiment, it is possible to perform a scanning action of light through a large angle of deflection, while preventing translational movement of the mirror section 12 in the Z direction.

<<Piezoelectric Material>>

A piezoelectric body suitable for the present embodiment may include a perovskite type oxide (P) of one type or two or more types as expressed by the following formula.

$$ABO_3 \quad (P)$$ General formula:

(where A is an A site element and is at least one type of element including Pb; B is a B site element and is at least one type of element selected from the group consisting of Ti, Zr, V, Nb, Ta, Sb, Cr, Mo, W, Mn, Sc, Co, Cu, In, Sn, Ga, Zn, Cd, Fe and Ni; O is an oxygen element; and a standard molar ratio of the A-site element, the B-site element and the oxygen element is 1:1:3, but this molar ratio may deviate from the standard molar ratio within a range which enables a perovskite structure to be obtained.)

A perovskite type oxide expressed by the general formula stated above may be: lead-containing compounds, such as lead titanate, lead zirconate titanate (PZT), lead zirconate, lead lanthanum titanate, lead lanthanum zirconate titanate, lead magnesium niobate zirconium titanate, nickel niobate lead zirconium titanate, zinc lead niobate-lead zirconium titanate, or the like, or mixed crystal systems of these; non-lead-containing compounds, such as barium titanate, strontium barium titanate, bismuth sodium titanate, bismuth potassium titanate, sodium niobate, potassium niobate, lithium niobate, bismuth ferrite, or the like, or mixed crystal systems of these.

The piezoelectric film according to the present embodiment desirably contains one type or two or more types of a perovskite type oxide (PX) as expressed by the following formula.

$$A_a(Zr_x, Ti_y, M_{b-x-y})_b O_c \quad (PX)$$

(where A is an A site element and is at least one type of element including Pb; M is at least one type of element selected from the group consisting of V, Nb, Ta and Sb; $0<x<b$, $0<y<b$, $0 \le b-x-y$; and $a:b:c=1:1:3$ is standard, but this molar ratio may deviate from the standard molar ratio within a range which enables a perovskite structure to be obtained.)

A piezoelectric film made of a perovskite oxide represented by General Formulas (P) and (PX) given above has a high piezoelectric distortion constant (d31 constant), and therefore the piezoelectric actuator including this piezoelectric film has excellent displacement characteristics. The perovskite type oxide represented by General Formula (PX) has a higher piezoelectric constant than that represented by General Formula (P).

Furthermore, the piezoelectric actuator having a piezoelectric film consisting of a perovskite oxide represented by General Formulas (P) and (PX) has voltage-displacement characteristics with excellent linearity in the range of the drive voltage. These piezoelectric materials display good piezoelectric characteristics when the present invention is implemented.

As one concrete example of the piezoelectric body 46 in the present embodiment, for example, it is possible to use a PZT thin film doped with Nb at 12%. By forming a film of PZT doped with Nb at 12% by sputtering, it is possible to stably manufacture a thin film having high piezoelectric characteristics such as a piezoelectric constant d31=250 pm/V.

Although it is possible to bond a bulk piezoelectric body to a substrate, taking account of the difficulty or processing, it is desirable to adopt a composition in which a piezoelectric thin film is directly formed onto a substrate by vapor epitaxy or sol gelation, or the like. In particular, desirably, the piezoelectric body 46 according to the present embodiment is a thin film having a thickness of no less than 1 nm and no more than 10 μm. In the embodiment described below, a 4 μm-thick PZT thin film formed by sputtering is used for the piezoelectric body 46, but the piezoelectric body 46 is not limited to this.

Practical Example 1

Specific Example of Manufacturing Method

In Practical Example 1, a MEMS scanner device 10 was manufactured by the following procedure.

(Step 1) A SOI (Silicon On Insulator) substrate having a 350-μm handle layer, a 1-μm box layer and a 10-μm device layer was taken and a 30-nm Ti layer and a 150-nm Ir electrode layer were formed thereon by sputtering at a substrate temperature of 350° C. This Ti layer and Ir electrode layer correspond to the lower electrode 43 in FIG. 3.

(Step 2) A 4-μm PZT layer was formed on the substrate obtained as described above, by a high-frequency (RF; radio frequency) sputtering apparatus. The film forming gas used was a mixed gas of 97.5% Ar and 2.5% $O_2$, and the target material used had a composition of $Pb_{1.3}(Zr_{0.52}Ti_{0.48})_{0.88}Nb_{0.12})O_3$. The film forming pressure was 2.2 mTorr and the film forming temperature was 450° C.

(Step 3) A Pt/Ti layer forming an upper electrode was patterned by lithography on the substrate obtained as described above, and a PZT thin film was etched by ICP (inductively coupled plasma) dry etching.

(Step 4) Thereupon, processing was carried out by a silicon dry etching process to manufacture a MEMS scanner device 10 illustrated in FIG. 1 to FIG. 3.

The fixing section 30 and the torsion bar supporting sections 22 have a structure which uses both the handle layer and the device layer, and the thickness thereof is approximately 370 μm.

The torsion bar supporting sections 22 serve to fix one end of each torsion bar 20. Furthermore, the fixing section 30 serves to fix one end of each piezoelectric cantilever (reference numeral 14B) and one end of each torsion bar supporting section 22 (reference numeral 22B). The piezoelectric actuator sections 14 each have a layered structure including a Si device layer (10 μm)/lower electrode/PZT thin film/upper electrode, and function as a piezoelectric thin film unimorph actuator.

The implementation of the present invention is not limited to Practical Example 1 described above, and the material of the substrate, the electrode material, the piezoelectric material, the film thickness, the film forming conditions, and the like, can be selected appropriately in accordance with the object.

<Evaluation of MEMS Scanner Device Relating to Practical Example 1>

Figures 11, 12:
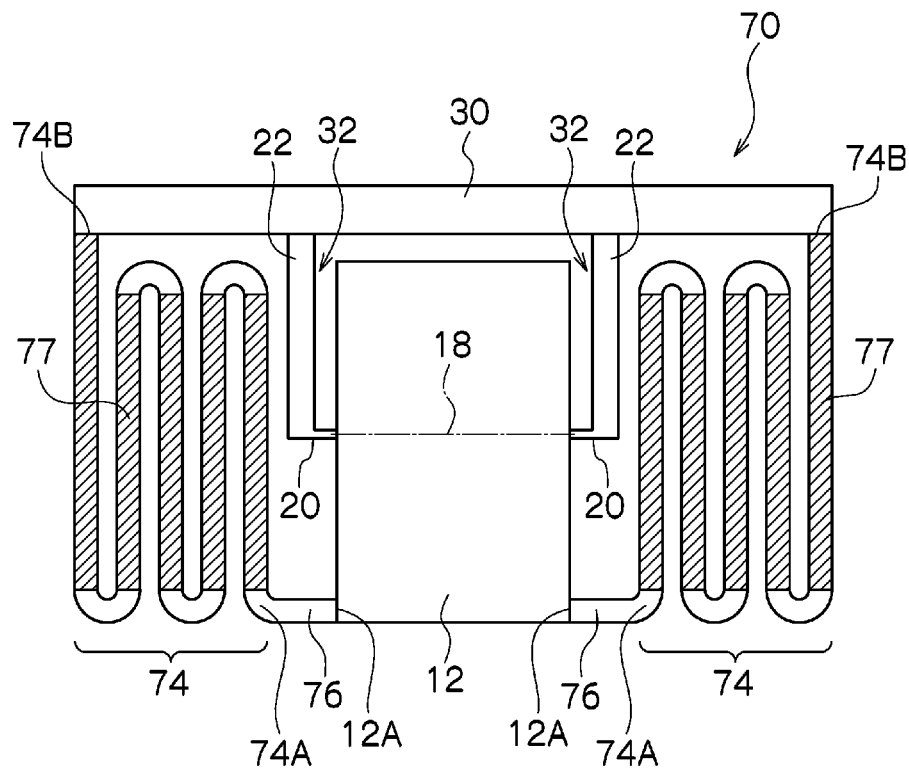
FIG. 11 is a table collecting measurement results for Practical Examples 1 and 2 and Comparative Examples 1 and 2.
FIG. 12 is a plan diagram showing a composition of a MEMS scanner device relating to a third embodiment.

When a drive voltage based on a sinusoidal wave (sine wave) having a potential amplitude Vp–p=0.5 V was applied to the piezoelectric actuator sections 14 of the MEMS scanner device 10 relating to Practical Example 1 which was manufactured by the procedure described above, a rotating resonance motion of the mirror about the axis of rotation was induced and when the mechanical deflection angle of the mirror section was measured as a laser scanning angle, then the resonance frequency fx was 198 Hz and the mechanical deflection angle was ±22° (see FIG. 11).

On the other hand, taking the resonance frequency of the mode of translational motion of the mirror section in the perpendicular direction (z direction) as fy, when this frequency was measured by laser Doppler measurement, fy was 2100 Hz, which is no less than 10 times greater than fx.

According to this Practical Example 1, since the value of the resonance frequency fy of the translational mode is sufficiently high and is sufficiently separated from the resonance frequency fx of the rotational mode, which is the drive frequency, then oscillation of the mirror section in the perpendicular direction is not liable to be excited by ambient vibrations or by drive oscillations, and it is possible to achieve rotational motion only, in a stable fashion.

With regard to the frequency of the ambient vibration, in the case of use in an automobile for example, in order that a particular oscillation mode is not excited by ambient vibrations, the resonance frequency of the oscillation is required to be no less than 200 Hz. In general portable use and handheld operations apart from use in an automobile, and the like, the oscillations due to external disturbances are of low frequency, and therefore use in a broad range of applications can be achieved by adopting a criteria of no less than 200 Hz. More specifically, if the resonance frequency fy of the translational mode has a value exceeding 200 Hz, then it is possible to prevent the occurrence of translational motion due to the ambient vibration (external disturbance).

Furthermore, in respect of the effects of the drive oscillation, by setting a large difference between the frequency of the drive oscillation and the oscillation resonance frequency of the translational mode, resonance in the translational mode is not liable to be excited by the drive oscillation.

The frequency of the drive oscillation is a frequency equal to or close to the resonance frequency fx of the rotational mode, and therefore in practical terms, if the resonance frequency fy of the translational mode is no less than 1.1 times the resonance frequency of the drive oscillation (the resonance frequency fx of the rotational mode), it is possible sufficiently to ignore the excitation of a translational mode by the drive oscillation.

In other words, desirably, the ratio fy/fx between the resonance frequency fx of the rotational mode and the resonance frequency fy of the translational mode is no less than 1.1. In order to suppress the excitation of the translational mode by the drive oscillation, the greater the difference between fy and fx, the better, and therefore desirably the ratio fy/fx therebetween satisfies the condition of being no less than 2.

In the case of Practical Example 1, since fy/fx is no less than 10, then the excitation of the translational mode by the drive oscillation is extremely small and can be ignored.

Second Embodiment

Figure 6:
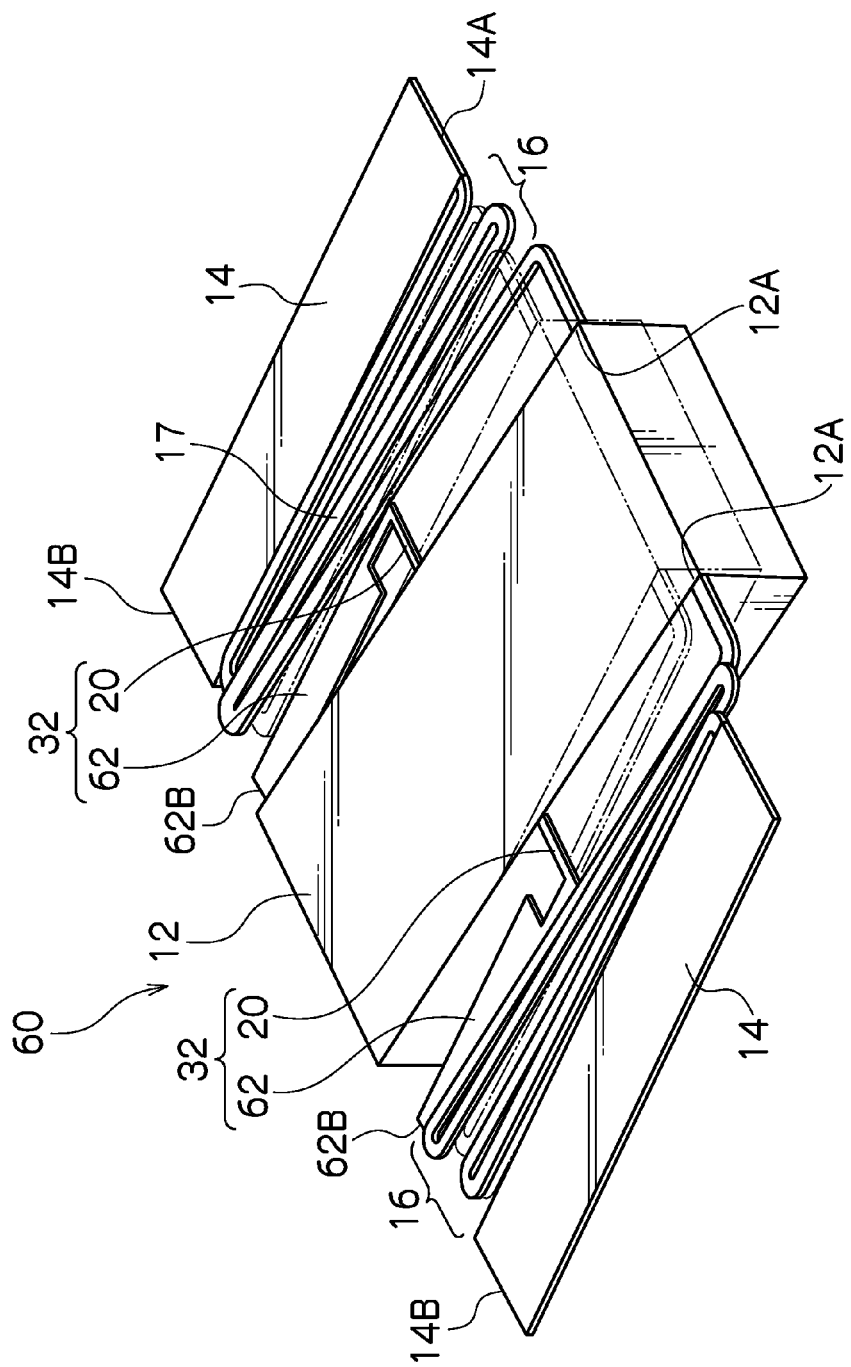
FIG. 6 is a principal perspective diagram for describing a rotational mode in a MEMS scanner device relating to the second embodiment.
Figure 7:
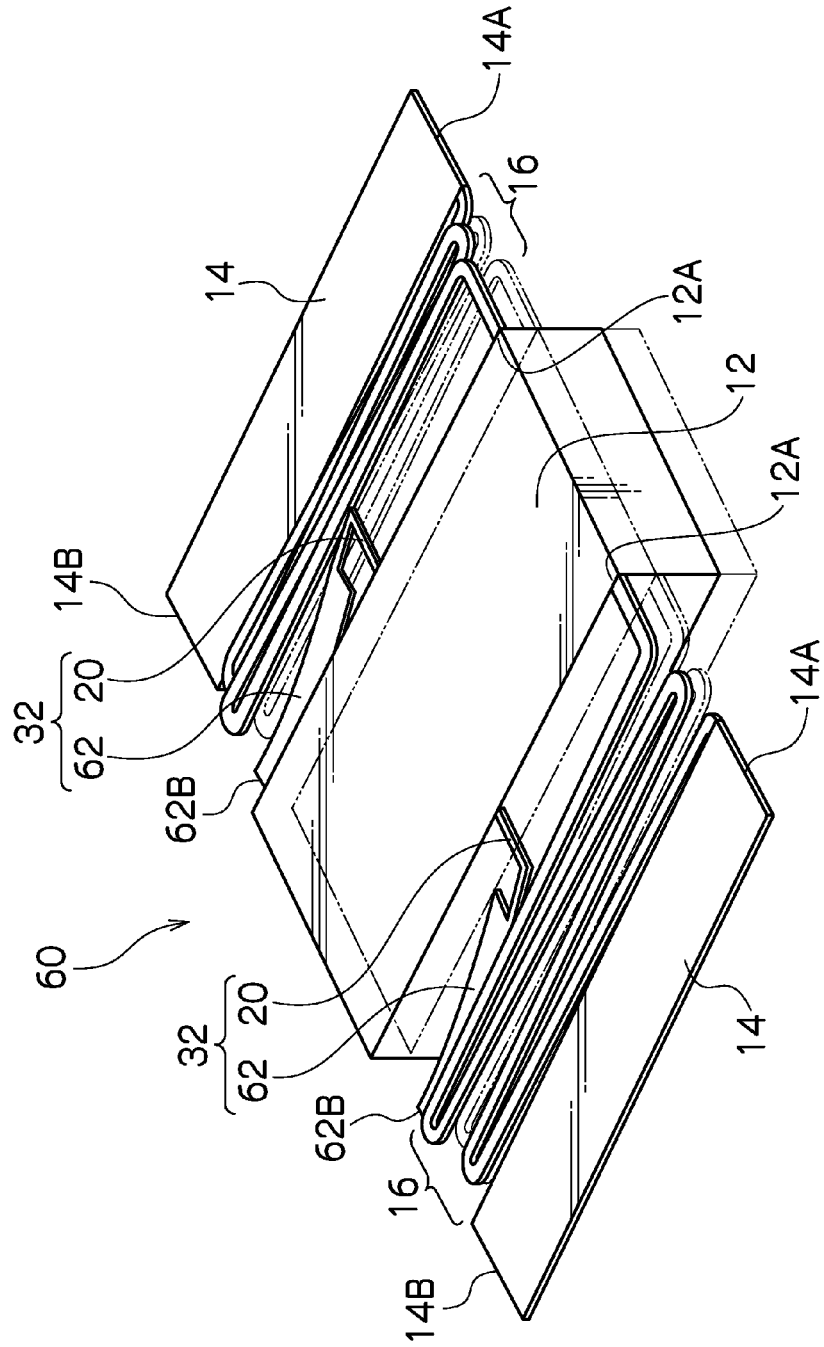
FIG. 7 is a principal perspective diagram for describing movement in a translational mode in a MEMS scanner device relating to the second embodiment.

FIG. 6 and FIG. 7 are perspective diagrams showing a principal part of a MEMS scanner device relating to a second embodiment. FIG. 6 is a perspective diagram illustrating motion according to a rotational mode and FIG. 7 is a perspective diagram illustrating motion according to a translational mode. In FIG. 6 and FIG. 7, members which are the same as or similar to the composition described in FIG. 1 to FIG. 5 are labeled with the same reference numerals, and description thereof is omitted here. Furthermore, in FIG. 6 and FIG. 7, the fixing section 30 is omitted from the illustration.

The MEMS scanner device 60 according to the second embodiment differs from the first embodiment in that torsion bar supporting sections 62 having a thin plate structure are employed instead of the torsion bar supporting sections 22 in the MEMS scanner device 10 according to the first embodiment. The remainder of the composition is a similar structure to the first embodiment, and the method of manufacture also uses the same processes as Practical Example 1.

The base ends 62B of the torsion bar supporting sections 62 are fixed and supported by a fixing section 30, which is not illustrated. A combination of a torsion bar 20 and a torsion bar supporting section 62 constitutes a perpendicular translational motion suppressing section 32. By suitably designing the thickness and shape of the torsion bar supporting sections 62, it is possible to adjust the rigidity and the resonance frequency to desired values. Furthermore, by adopting a unimorph structure in which the torsion bar supporting sections are layered as a Si thin plate/lower electrode/piezoelectric film/upper electrode, it is possible to regulate perpendicular displacement actively by imparting a direct displacement to the central axis of the mirror.

Practical Example 2

In Practical Example 2, a MEMS scanner device 60 according to the second embodiment was manufactured by a similar process to Practical Example 1. When a drive voltage based on a sinusoidal wave having a potential amplitude Vp–p=0.5 V was applied to the piezoelectric actuator sections 14 of the MEMS scanner device 60 relating to Practical Example 2, a rotating resonance motion of the mirror about the axis of rotation was induced (see FIG. 6) and when the mechanical deflection angle of the mirror section 12 was measured as a laser scanning angle, then the resonance frequency fx was 180 Hz and the mechanical deflection angle was ±24° (see FIG. 11).

On the other hand, taking the resonance frequency of the mode of translational motion of the mirror section 12 in the perpendicular direction (see FIG. 7) as fy, when this frequency was measured by laser Doppler measurement, fy was 500 Hz, which is 2.8 times greater than fx.

The resonance frequency fy of the translational mode of the MEMS scanner device 60 relating to Practical Example 2 is higher than 200 Hz, and therefore is not liable to be affected by ambient vibration. Furthermore, since the ratio fy/fx between the resonance frequency fy of the translational mode of the MEMS scanner device 60 relating to the second embodiment and the resonance frequency fx of the rotational mode is greater than 2, then the effects of excitation of the translational mode due to the drive oscillation are also suppressed.

Moreover, since the torsion bar supporting sections 62 are composed by thin plates in the MEMS scanner device 60 relating to Practical Example 2, then the stress applied to the torsion bars 20 is lower than in Practical Example 1, and breaking of the torsion bars by the driving process can be prevented.

Comparative Example 1

Figure 8:
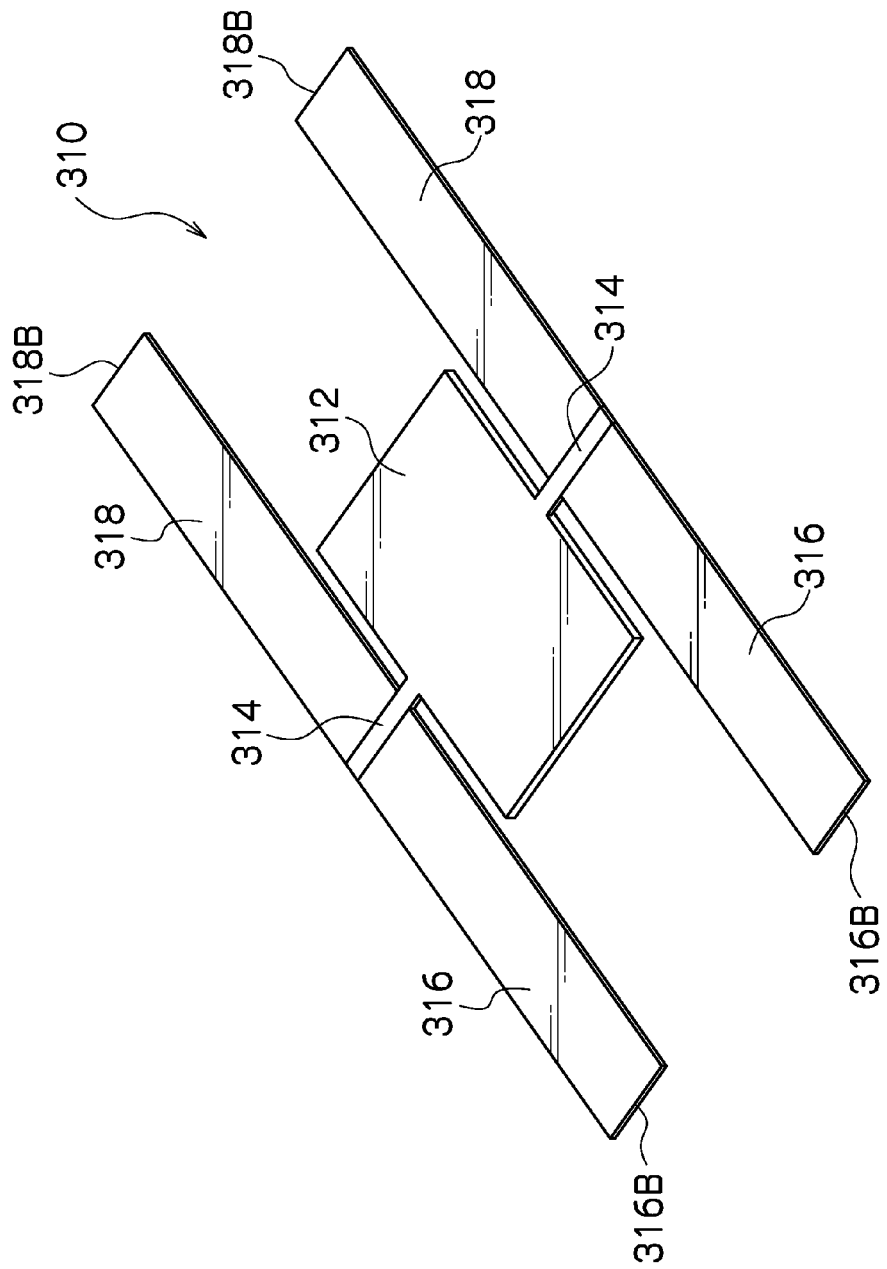
FIG. 8 is a perspective diagram showing the principal composition of a MEMS scanner device relating to Comparative Example 1.
Figure 14:
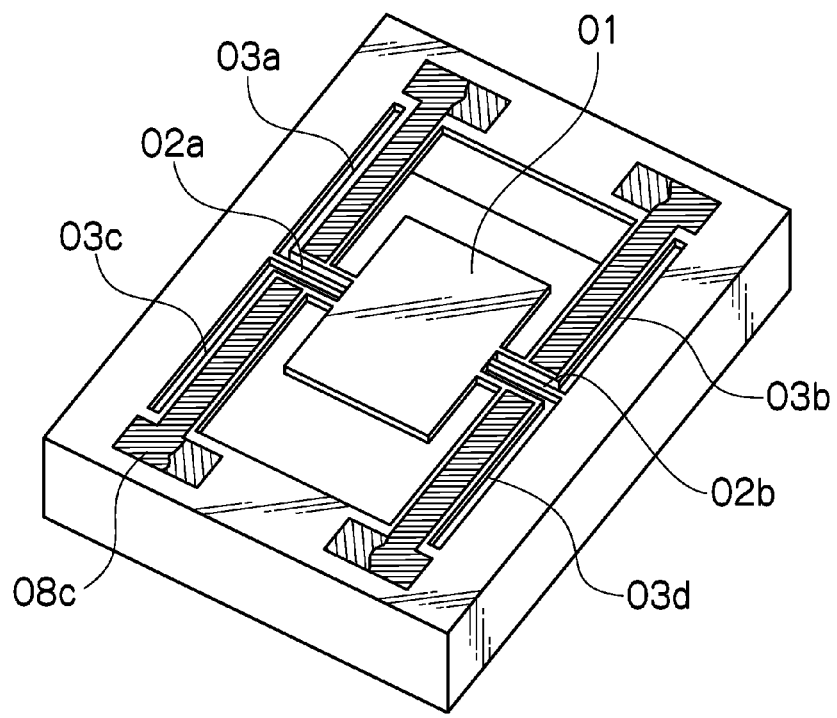
FIG. 14 is a perspective diagram showing a conventional torsion bar structure.
Figure 15:
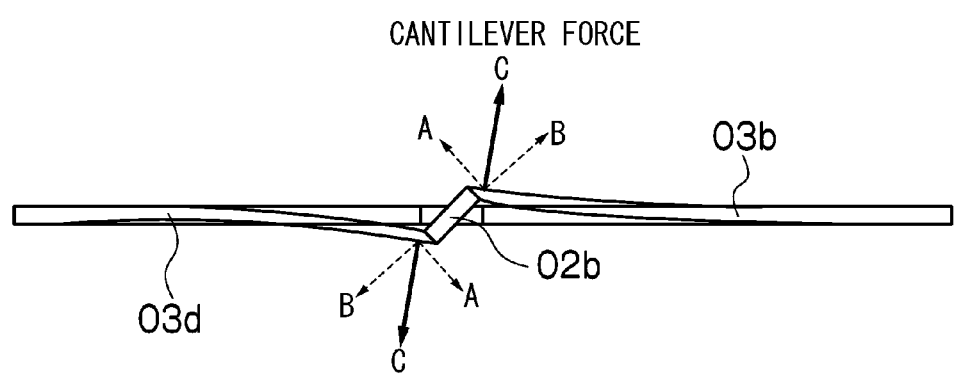
FIG. 15 is a schematic cross-sectional diagram showing movement in a conventional torsion bar structure.

A MEMS scanner device 310 as shown in FIG. 8 was manufactured using a SOI substrate, by a similar method to Practical Example 1. The MEMS scanner device 310 relating to this Comparative Example 1 corresponds to the torsion bar structure illustrated in FIG. 14. In the MEMS scanner device 310 in FIG. 8, torsion bars 314 connected to the center of rotation of a mirror section 312 are provided on either side of the mirror section 312, and two piezoelectric actuator sections 316, 318 are connected to the respective torsion bars 314.

The piezoelectric actuator sections 316, 318 are actuators respectively having a piezoelectric unimorph cantilever structure, and the end portions 316B, 318B of the piezoelectric actuator sections 316, 318 are fixed to a fixing and supporting member (fixing section) which is not illustrated.

A rotational motion of the mirror section 312 is generated by twisting the torsion bars 314 through driving the two piezoelectric actuator sections 316, 318 connected to either side of the respective torsion bars 314, in opposing directions.

Figure 9:
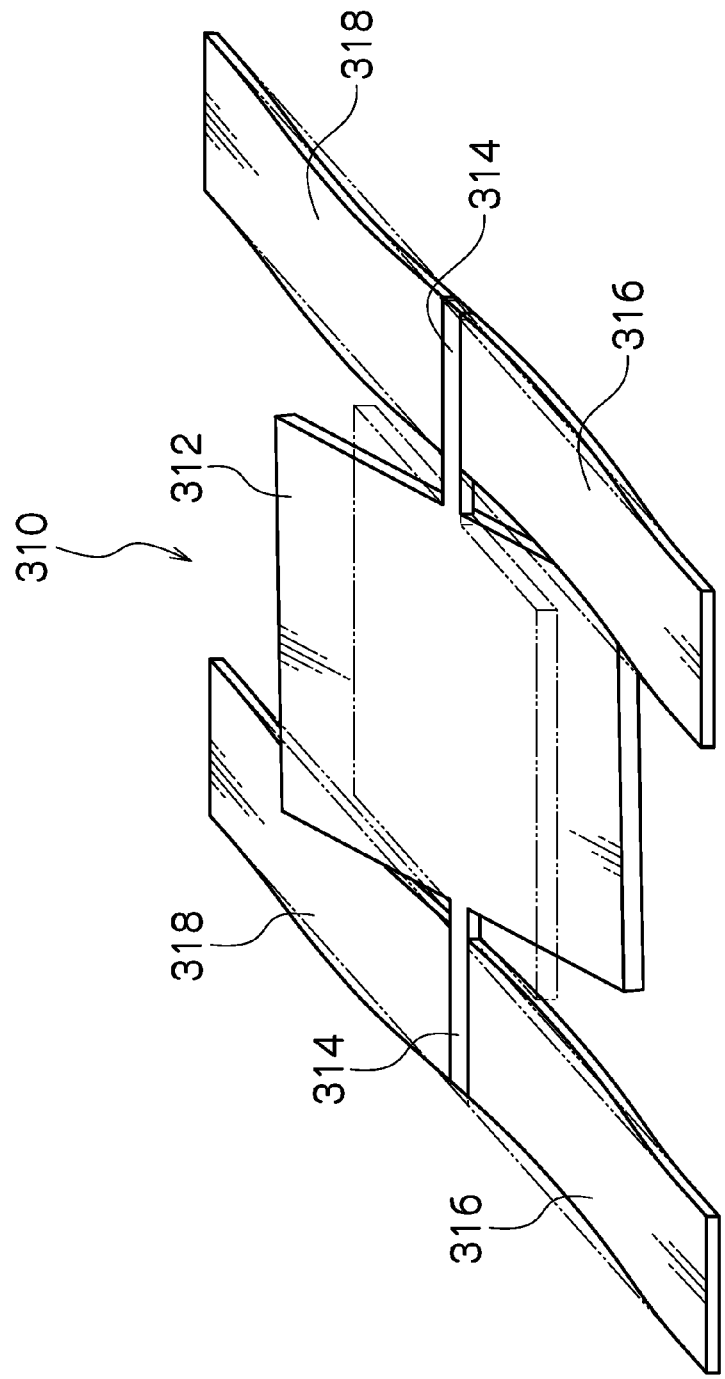
FIG. 9 is an illustrative diagram of movement in a rotational mode in the composition according to Comparative Example 1.
Figure 10:
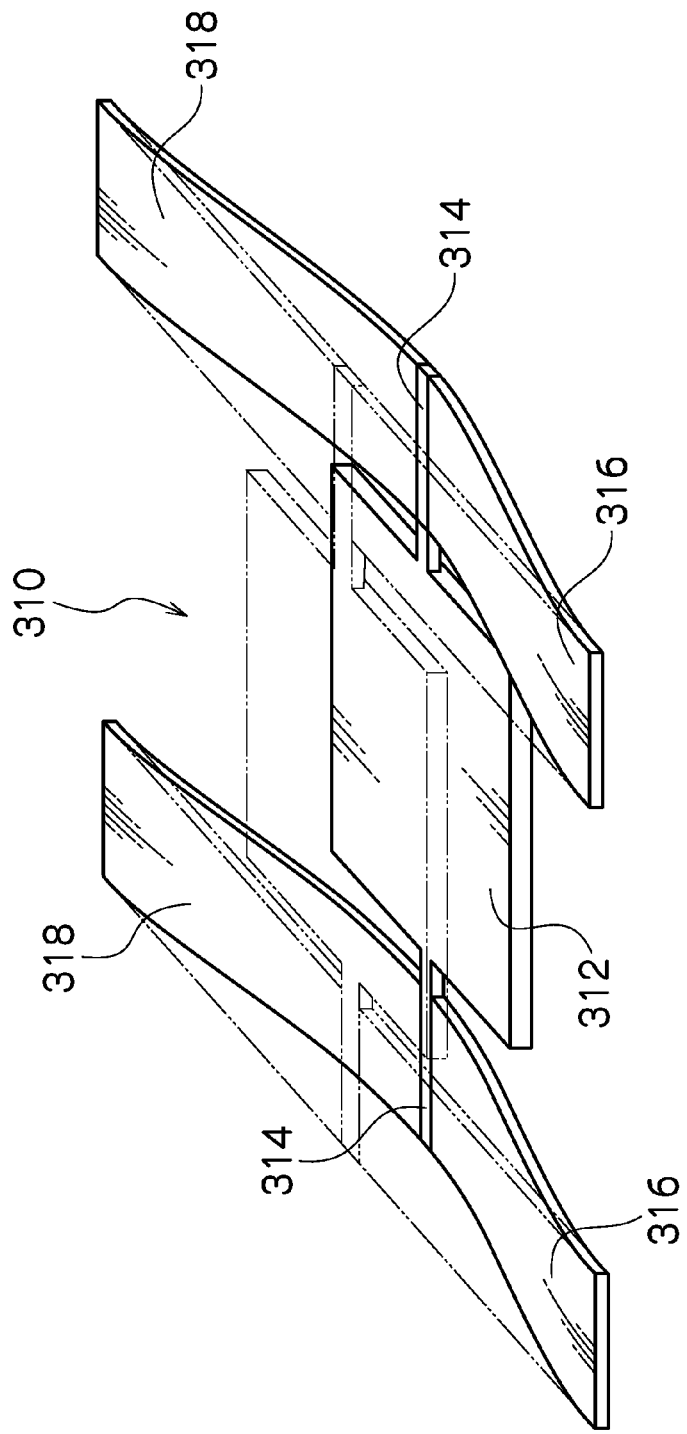
FIG. 10 is an illustrative diagram of movement in a translational mode in the composition according to Comparative Example 1.

FIG. 9 is a perspective diagram showing a state of driving in a rotational mode in the composition according to Comparative Example 1, and FIG. 10 is an illustrative diagram of movement in a translational mode in a composition according to Comparative Example 1.

In the structure according to Comparative Example 1, when a drive voltage based on a sinusoidal wave having a potential amplitude Vp–p=0.5 V was applied to the piezoelectric actuator sections 316, 318, a rotating resonance motion of the mirror about the axis of rotation was induced and when the mechanical deflection angle of the mirror section was measured as a laser scanning angle, then the resonance frequency fx was 200 Hz and the mechanical deflection angle was ±2.5°.

It can be seen that with this method, the angle of deflection is small and a sufficient scanning angle cannot be obtained. Furthermore, in this method, it is necessary to make the torsion bars 314 fine and/or long in order to achieve a high angle of displacement, and hence there is a problem in that the torsion bars can break readily during handling.

Moreover, in the composition according to Comparative Example 1, if the resonance frequency of a mode where the mirror section performs translational motion in the perpendicular direction (see FIG. 10) is taken as fy, then when this resonance frequency was measured by laser Doppler measurement, the result was fy=98 Hz. In Comparative Example 1, excitation of a translational mode is liable to occur due to the effects of the ambient oscillations, and the amplitude of oscillation in the translational mode is also large.

Comparative Example 2

Figure 16:
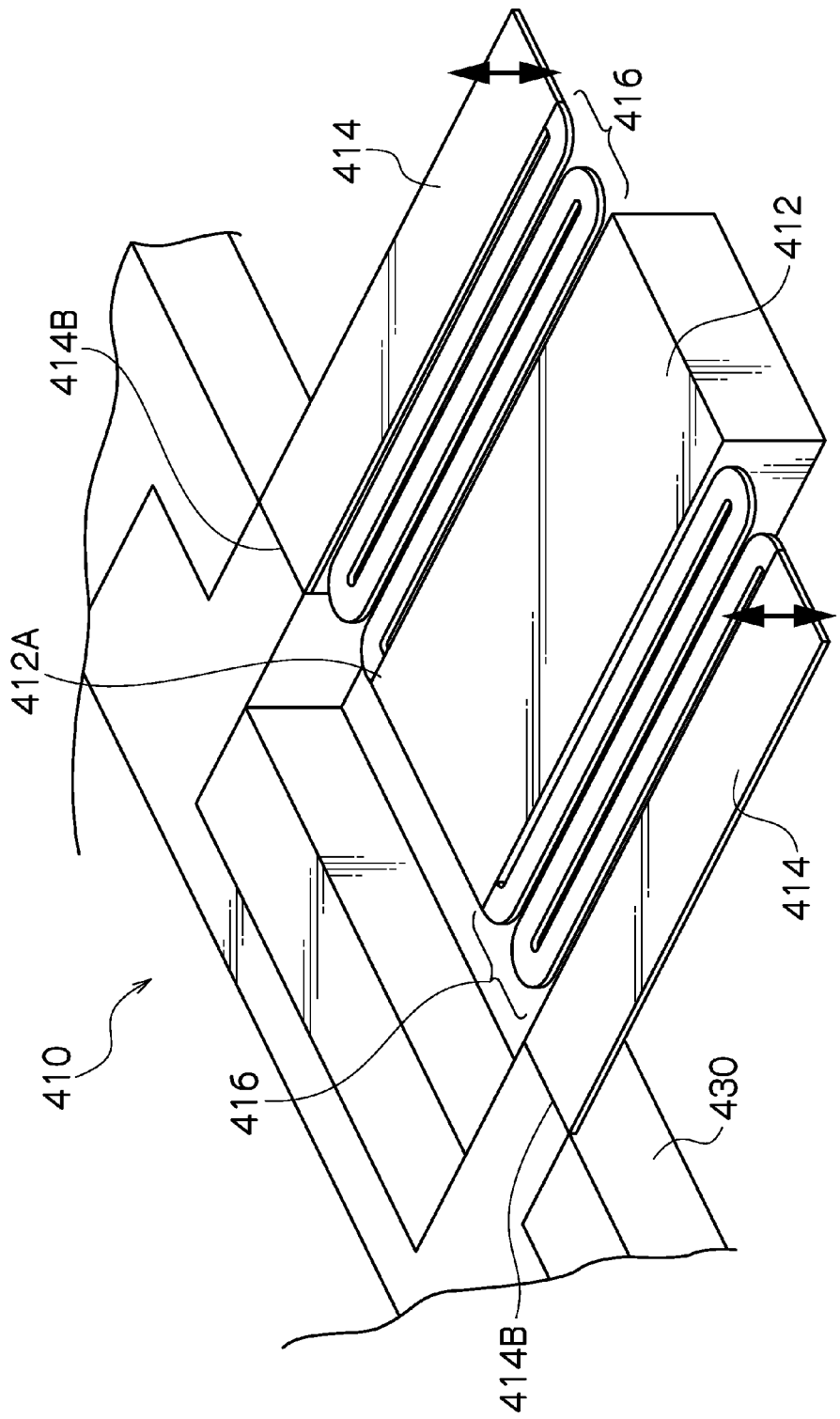
FIG. 16 is a perspective diagram showing a conventional bending hinge structure relating to Comparative Example 2.
Figure 17:
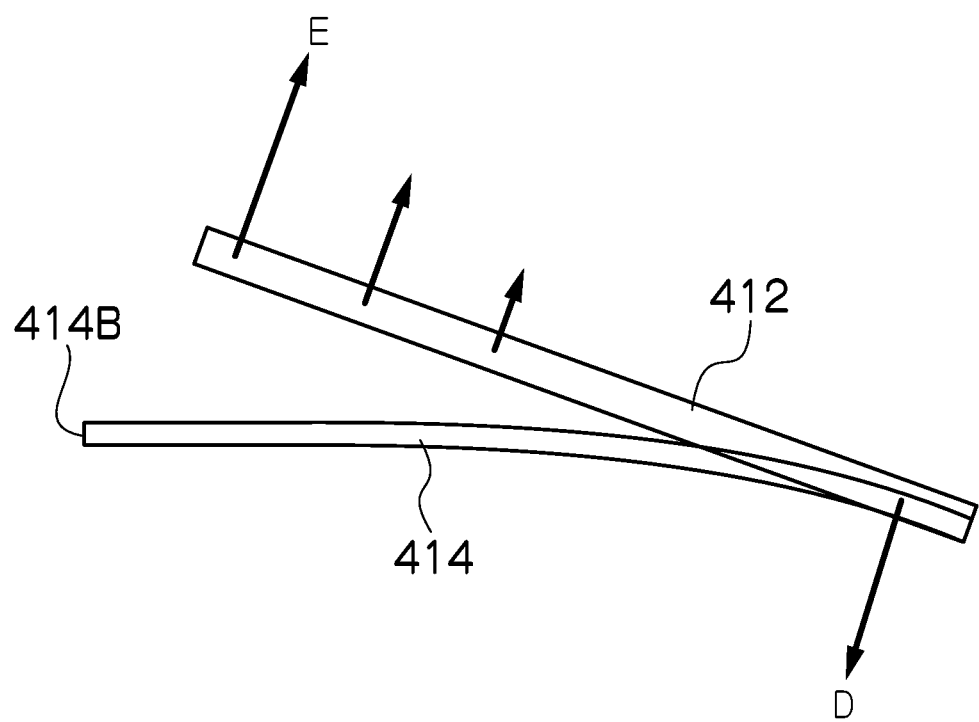
FIG. 17 is a schematic drawing for illustrating movement based on a bending hinge structure.

A MEMS scanner device 410 as shown in FIG. 16 was manufactured using a SOI substrate, by a similar method to Practical Example 1. The MEMS scanner device 410 relating to this Comparative Example 2 corresponds to a "bending hinge structure", in which the torsion bars 20 and the torsion bar supporting sections 22 (or 62) which constitute the perpendicular translational motion suppressing sections 32 are removed in comparison with the first embodiment and the second embodiment.

Figure 18:
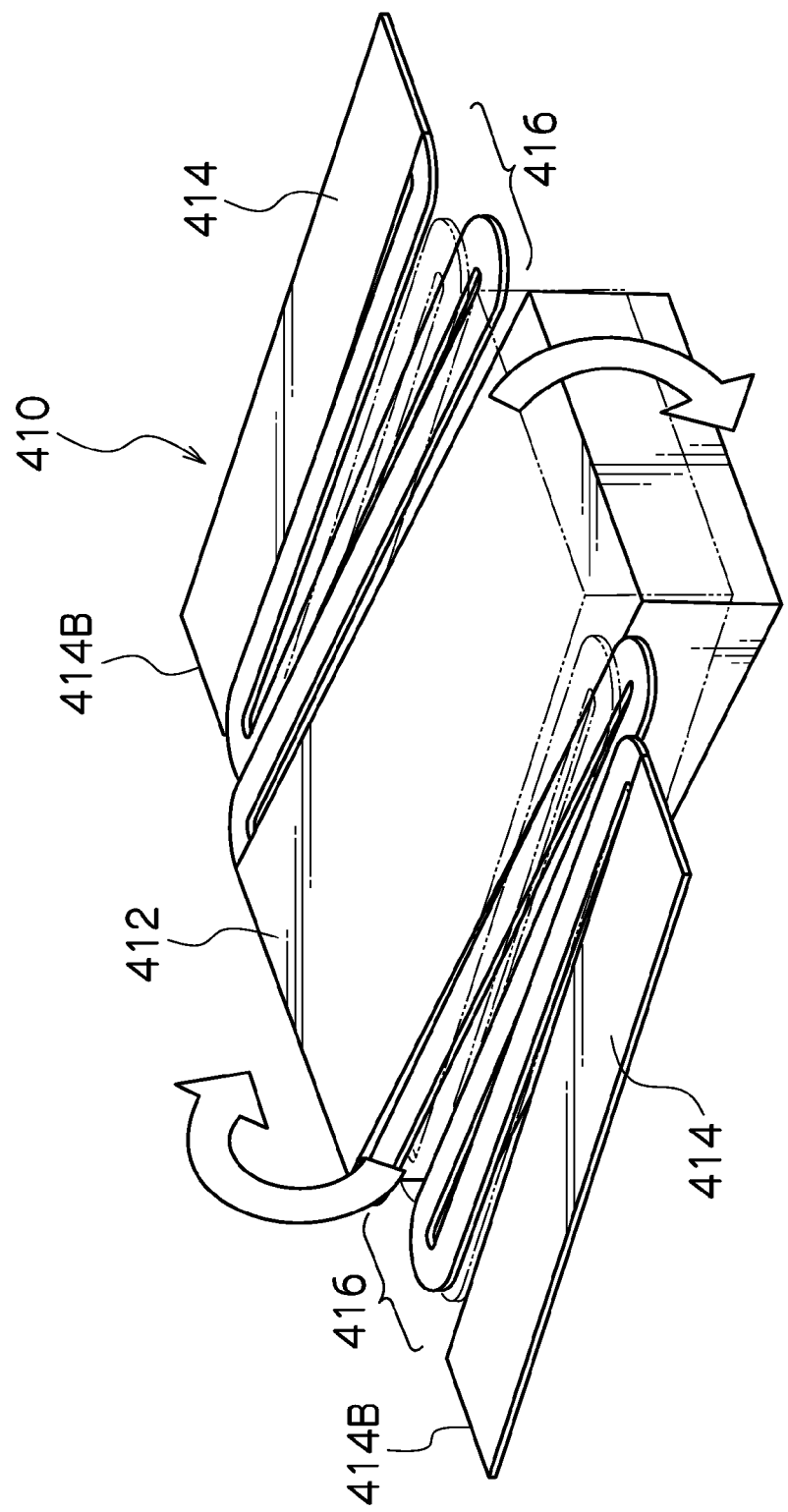
FIG. 18 is an illustrative diagram of movement in a rotational mode in the composition according to Comparative Example 2.
Figure 19:
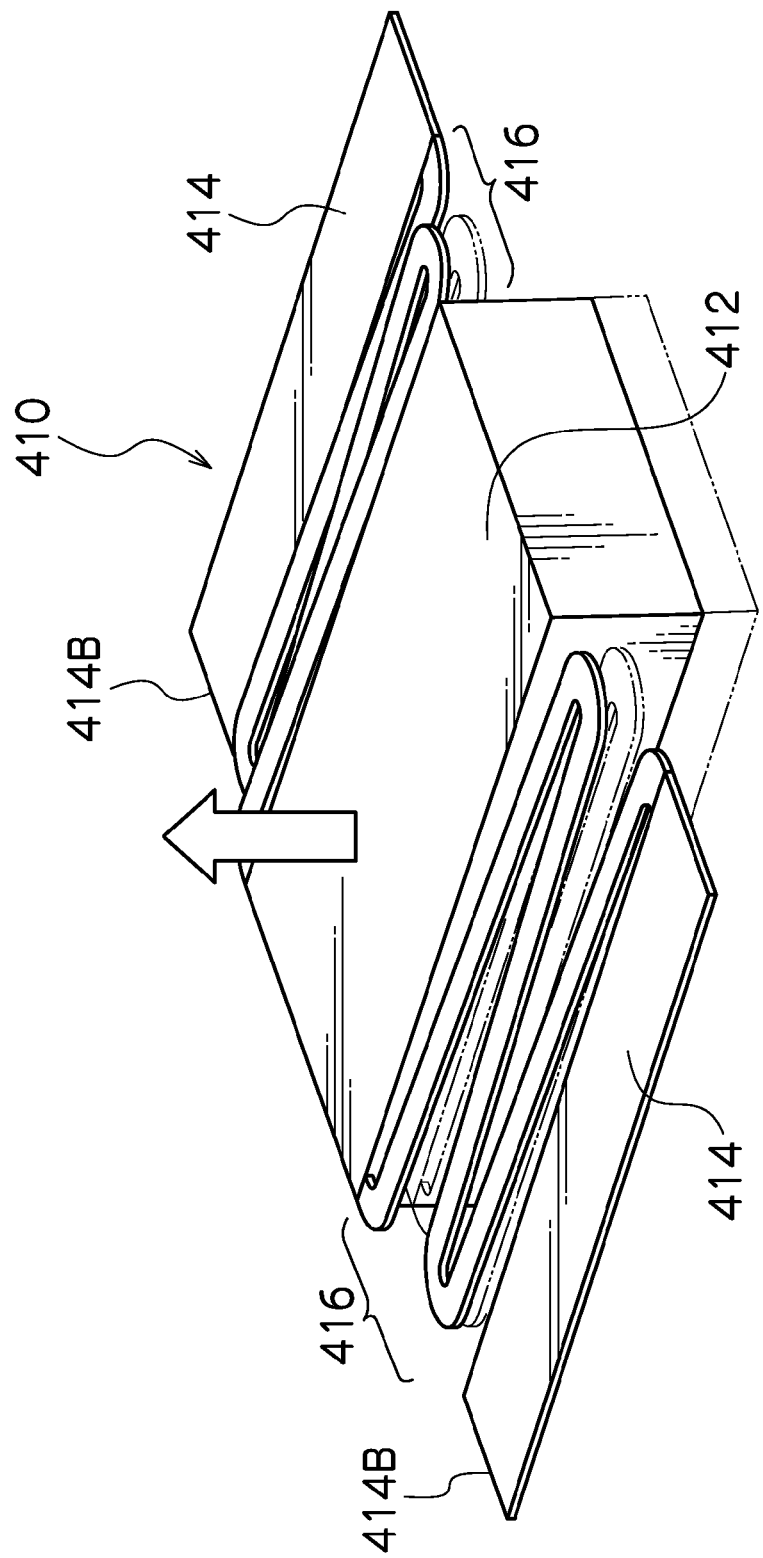
FIG. 19 is an illustrative diagram of movement in a translational mode in the composition according to Comparative Example 2.

When a drive voltage based on a sinusoidal wave having a potential amplitude Vp–p=0.5 V was applied to the piezoelectric actuators (piezoelectric cantilevers 414) of the MEMS scanner device 410 relating to Comparative Example 2, a rotating resonance motion of the mirror about the axis of rotation was induced (see FIG. 18) and when the mechanical deflection angle of the mirror section was measured as a laser scanning angle, then the resonance frequency fx was 190 Hz and the mechanical deflection angle was ±25° (see FIG. 11). On the other hand, taking the resonance frequency of the mode of translational motion of the mirror section in the perpendicular direction (see FIG. 19) as fy, when this frequency was measured by laser Doppler measurement, fy was 200 Hz, which is 1.05 times fx and hence very close indeed to fx.

In Comparative Example 2, although it is possible to obtain a sufficiently large scanning angle, since the value of fy is relatively low, at 200 Hz, then there is a possibility that the mirror section will move significantly in the perpendicular direction due to the effects of ambient vibration during rotational motion. Furthermore, since fy is very close to fx, which is the drive frequency, then there is a problem in that oscillation in the perpendicular direction of the mirror section is liable to be excited by the drive oscillations. In practical terms, if the mirror section is displaced in the perpendicular direction, then this gives rise to variation in the optical path length and variation in the focal point, and therefore an optical deflector (mirror device) which is liable to produce translational movement in the perpendicular direction cannot withstand practical use.

<Summary of Measurement Results>

FIG. 11 shows a table giving an overall comparison of the evaluation (measurement) results of the Practical Examples 1 and 2, and the Comparative Examples 1 and 2. In the composition described in relation to Practical Examples 1 and 2, it is possible to obtain a mirror tilt angle having a large displacement, and furthermore, excitation of perpendicular translational motion of the mirror section due to ambient vibrations and drive oscillations can also be significantly suppressed.

Third Embodiment

FIG. 12 is a plan diagram showing a composition of a MEMS scanner device 70 relating to a third embodiment. In FIG. 12, members which are the same as or similar to the composition shown in FIG. 1 to FIG. 5 are labeled with the same reference numerals and further explanation thereof is omitted here. The third embodiment adopts a structure which combines piezoelectric actuator sections 74 based on a meandering piezoelectric cantilever structure, and perpendicular translational motion suppressing sections 32.

Of the piezoelectric actuator sections 74 in FIG. 12, the portion indicated by diagonal hatching is a piezoelectric cantilever element 77 having a layered structure including a diaphragm/lower electrode/piezoelectric body/upper electrode.

In the piezoelectric actuator sections 74, a plurality of piezoelectric cantilever elements 77 are arranged in parallel and the end portions of mutually adjacent piezoelectric cantilever elements 77 are connected together so as to fold back in a meandering shape. This example shows a composition in which five piezoelectric cantilever elements 77 are connected together, but the number of piezoelectric cantilever elements 77 can be set to a suitable number no less than two.

One end 74A of each piezoelectric actuator section 74 is connected via a coupling section 76 to an end portion 12A of a mirror section 12 in a lengthwise direction thereof, and the other end 74B is fixed and supported on a fixing section 30.

In a structure of this kind, by driving the piezoelectric actuator sections 74 in such a manner that the mutually adjacent piezoelectric cantilever elements 77 therein are induced to bend in opposing directions, the displacements of the respective piezoelectric cantilever elements 77 accumulates and the amount of displacement is increased. This structure is capable of tilting the mirror section 12 by a large amount, even without using resonance.

Furthermore, since the vicinity of the rotating axis 18 is supported by the composition of the torsion bars 20 and the torsion bar supporting sections 22, then translational motion of the mirror section 12 is suppressed.

Fourth Embodiment

Figure 13:
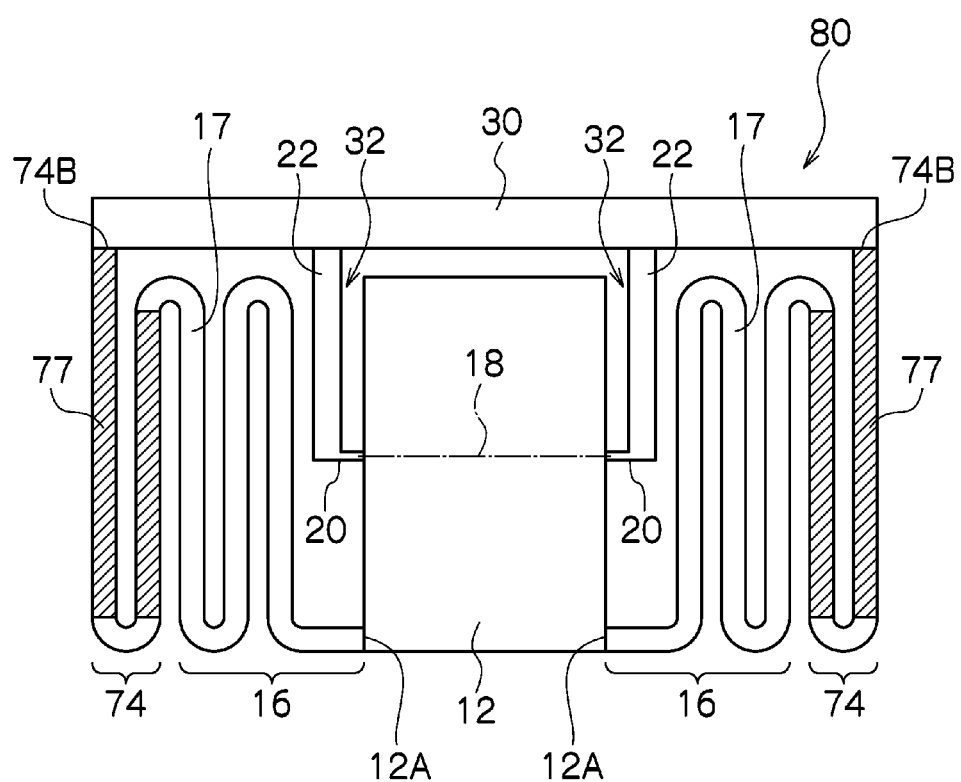
FIG. 13 is a plan diagram showing a composition of a MEMS scanner device relating to a fourth embodiment.

FIG. 13 is a plan diagram showing a composition of a MEMS scanner device 80 relating to a fourth embodiment. In FIG. 13, members which are the same as or similar to the composition shown in FIG. 1 to FIG. 5 and FIG. 12 are labeled with the same reference numerals and further explanation thereof is omitted here.

The fourth embodiment adopts a structure which combines a meandering piezoelectric cantilever structure, a bending hinge structure and a perpendicular translational motion suppressing section.

Instead of the composition of the coupling sections 76 illustrated in FIG. 12, it is possible to adopt coupling sections 16 of a meandering shape as illustrated in FIG. 1. According to the fourth embodiment shown in FIG. 13, the mutually adjacent piezoelectric cantilever elements 77 in the piezoelectric actuator sections 74 are driven to bend in opposing directions. Thereby, even without using resonance, it is possible to increase the displacement of the piezoelectric actuator sections 74, to cause the ends of the mirror section to oscillate up and down (the thickness direction of the mirror), and to induce rotation of the mirror section.

In the third and fourth embodiments, a piezoelectric cantilever having a spiral-shaped fold-back structure was used as a piezoelectric actuator section 74, but in implementing the present invention, there are no particular restrictions on whether or not a fold-back structure is used in the lever suction, or on the number of folds. The greater the number of folds in the cantilever, the larger the amount of displacement that can be achieved.

In the third and fourth embodiments, it is also possible to induce rotational motion of a mirror section by resonance driving. The number of folds in the cantilevers and the width of the lever sections, and the like, affect the overall resonance frequency. The greater the number of folds, the lower the resonance frequency tends to become. Furthermore, the finer the width of the lever sections, the lower the resonance frequency tends to become. By designing the number of folds and the width of the lever sections, and the like, it is possible to achieve a desired resonance frequency.

<Method of Supplying Drive Voltage to Meandering Piezoelectric Cantilever Structure>

As a device for driving the mutually adjacent piezoelectric cantilever elements 77 to bend in opposing directions, it is possible to adopt a composition which applies drive voltages of opposite polarities to the adjacent piezoelectric cantilever elements 77.

Alternatively, by making the polarization directions different in the piezoelectric bodies of the adjacent piezoelectric cantilever elements 77 (by polarizing in opposite directions), it is possible to drive bending in opposite directions by application of a drive voltage of the same polarity.

Possible drive waveforms to be supplied to the piezoelectric cantilever elements 77 may include: a mode using a DC voltage signal which does not excite resonance, a mode using an AC signal or a pulse waveform signal of a frequency which does not excite resonance, or a mode using an AC signal or a pulse waveform signal which does excite resonance.

<Action and Beneficial Effects of the First to Fourth Embodiments>

(1) Since the direction of displacement of the piezoelectric cantilevers is virtually the same as the direction of rotation of the mirror at all times, then virtually all of the force of the cantilevers is used to rotate the mirror. The force use efficiency is good and the angle of rotation is much larger than with a conventional torsion bar structure.

(2) By providing torsion bars which support the region of the axis of rotation of the mirror, it is possible substantially to ignore the effects of a translational mode in which the mirror is displaced by a large amount in the z direction (perpendicular direction). By this means, it is possible both to achieve a large scanning angle and to suppress variation in the optical path length due to external disturbances, and the like.

(3) By arranging a thin film having a piezo resistance effect in the torsion bar portions which constitute the perpendicular translational motion suppressing sections 32, it is possible to detect the stress of the torsion bars 20 directly. By this stress detecting function, it is possible accurately to measure the angle of the mirror during driving.

(4) By imparting rigidity to the screw hinge, it is possible to design a MEMS scanner which is driven at a high resonance frequency.

(5) It is also possible to form the fixing section, the piezoelectric actuator sections, the mirror section and the connecting sections (coupling sections), and the like, in an integrated fashion, by silicon processing.

(6) A more compact size can be achieved compared to a conventional polygon mirror or galvano mirror, and durability is also high.

(7) As described in Practical Examples 1 and 2, it is possible to form a MEMS scanner device by directly forming a PZT thin film on a substrate and carrying out a dry etching process. In this way, it is possible to carry out finer patterning, readily, by forming the piezoelectric body as a thin film, and therefore production yield can be greatly improved and further device compactification can be achieved.

However, in implementing the present invention, the actuator is not limited to a thin film piezoelectric body, and it is also possible to form a unimorph actuator by bonding a bulk piezoelectric body to a diaphragm, or to form a bimorph actuator by bonding two piezoelectric bodies having different polarities.

<Example of Device Size>

The size and actual shape of the MEMS scanner devices 10, 60, 70, 80 manufactured as embodiments of the present invention may adopt various modes. For example, the size of the device including the mirror section 12, the piezoelectric actuator sections 14 and the fixing section 30 in FIG. 1 and FIG. 2 is approximately 3 mm×2 mm in plan view. Even further compactification is possible, and a device of approximately 1 mm×1 mm is also possible.

Modification Example

In the first embodiment to the fourth embodiment, to form a perpendicular movement suppressing structure, a torsion bar 20 is connected respectively to either side of the mirror section 12 and the center of rotation of the mirror is supported by these torsion bars 20, but the method of stably supporting the axis of rotation of the mirror is not limited to this. For example, it is possible to adopt a composition in which the mirror is supported by a plurality of bars which are arranged in axial symmetry with respect to the axis of rotation.

<Examples of Application>

The present invention can be used in various applications as an optical apparatus which changes the direction of travel of light, such as laser light, by reflecting the light. For example, the present invention can be applied broadly to optical deflectors, optical scanning apparatuses, laser printers, bar code readers, display apparatuses, optical sensors of various types (distance sensors, shape measurement sensors), optical communication apparatuses, laser projectors, OCT image diagnosis apparatuses, and the like.

The present invention is not limited to the embodiments described above, and various modifications can be made within the scope of the technical idea of the invention, by a person having normal knowledge of the field.

<Disclosed Modes of the Invention>

As has become evident from the detailed description of the embodiment of the present invention given above, the present specification includes disclosure of various technical ideas including at least the inventions described below.

(Invention 1): A mirror driving apparatus, comprising: a mirror section having a reflecting surface which reflects light; a pair of piezoelectric actuator sections arranged on either side of the mirror section; coupling sections which respectively connect one end of each of the piezoelectric actuator sections to an end portion of the mirror section which is distant from an axis of rotation of the mirror section in a direction along the reflecting surface and perpendicular to the axis of rotation; a fixing section which supports another end of each of the piezoelectric actuator sections; and a perpendicular movement suppressing structure which suppresses translational motion of the axis of rotation of the mirror section in a direction perpendicular to the reflecting surface, one end of the perpendicular movement suppressing structure being connected to the fixing section and another end thereof being connected to the mirror section.

According to the invention 1, a pair of piezoelectric actuator sections are arranged on either side of a mirror section. One end of each piezoelectric actuator section is connected to the vicinity of an end of the mirror section via a coupling section, and the other end thereof is supported on a fixing section. By driving the piezoelectric actuator sections to displace the actuators, the end portion of the mirror section is displaced, thereby applying a rotational torque about an axis of rotation of the mirror section, and hence the mirror section can be driven to rotate.

In a structure of this kind, since the direction of displacement of the piezoelectric actuator sections substantially coincides with the direction of rotation of the mirror section, then it is possible to use the force of the piezoelectric actuator sections efficiently for rotational motion, and therefore a large angle of rotation (mirror tilt angle) can be achieved. Furthermore, since the mirror section according to the present invention is connected to a fixing section via a perpendicular movement suppressing structure, then it is possible to keep the axis of rotation in a uniform position and translational motion of the mirror section in the perpendicular direction is suppressed.

(Invention 2): The mirror driving apparatus as defined in the invention 1, wherein the perpendicular movement suppressing structure is a structure which connects the fixing section to a position on the mirror section that coincides with the axis of rotation, or to a plurality of positions on the mirror section that have axial symmetry with respect to the axis of rotation.

In order to effectively suppress translational motion of the mirror section in the perpendicular direction, a desirable composition is one which supports the vicinity of the axis of rotation of the mirror section. Apart from a composition which connects the mirror section and the perpendicular movement suppressing structure at a position substantially coinciding with the position of the axis of rotation, it is also possible to adopt a composition which connects the mirror section and perpendicular movement suppressing structure at a plurality of positions which have axial symmetry with respect to the axis of rotation.

(Invention 3): The mirror driving apparatus as defined in the invention 1 or 2, wherein the perpendicular movement suppressing structure includes: a torsion bar which is connected to a position coinciding with the axis of rotation on the mirror section and which extends in an axial direction of the axis of rotation outwardly from the mirror section; and a torsion bar supporting section which is connected to the torsion bar and also connected to the fixing section and which supports the torsion bar.

As a concrete mode of a perpendicular movement suppressing structure, it is possible to employ a structure which includes a torsion bar connected to the vicinity of the axis of rotation and a torsion bar supporting section which connects the torsion bar to the fixing section. The torsion bar suppresses translational motion of the mirror section in the perpendicular direction, by tensile force.

(Invention 4): The mirror driving apparatus as defined in the invention 3, wherein the torsion bar supporting section has a thickness identical to that of the fixing section.

According to this mode, it is possible to make the resonance frequency of the translational motion a high value. By this means, it is possible to greatly suppress excitation of perpendicular motion of the mirror section due to ambient vibrations and drive oscillations.

(Invention 5): The mirror driving apparatus as defined in the invention 3, wherein the torsion bar supporting section has a thin plate structure of which thickness is smaller than a thickness of the fixing section.

By designing the thickness of the torsion bar supporting sections appropriately, it is possible to adjust the stress applied to the torsion bars. As the torsion bar supporting sections are made thinner, so the stress applied to the torsion bars can be reduced further, and breakdown of the torsion bars by driving can be prevented further. Moreover, by adjusting the thickness of the torsion bar supporting sections, it is possible to adjust the resonance frequency of the translational mode also.

(Invention 6): The mirror driving apparatus as defined in any one of the inventions 1 to 5, wherein the coupling sections each have a structure in which at least one thin plate member having a direction perpendicular to the axis of rotation as its lengthwise direction is arranged so as to fold back in a meandering shape along the reflecting surface.

According to a composition of this kind, the coupling sections are displaced readily, and the angle of rotation can be increased.

(Invention 7): The mirror driving apparatus as defined in any one of the inventions 1 to 6, wherein the piezoelectric actuator sections are each constituted by one or a plurality of piezoelectric cantilevers.

The piezoelectric actuator section may be constituted by one piezoelectric cantilever, or may be constituted by combining a plurality of piezoelectric cantilevers in a meandering shape.

(Invention 8): The mirror driving apparatus as defined in any one of the inventions 1 to 7, wherein the piezoelectric actuator sections are each constituted by a piezoelectric unimorph cantilever in which a diaphragm, a lower electrode, a piezoelectric body and an upper electrode are successively layered.

The piezoelectric actuator section is not limited to a unimorph structure, and may also employ a bimorph structure, but a unimorph structure is the most simple composition.

(Invention 9): The mirror driving apparatus as defined in any one of the inventions 1 to 8, wherein connecting portions between the mirror section and the coupling sections are caused to oscillate by displacing the piezoelectric actuator sections so as to induce a rotational motion of the mirror section about the axis of rotation.

By oscillating the end portions of the mirror section, a rotational torque is applied to the mirror section due to an inertial force, and rotational motion is induced.

(Invention 10): The mirror driving apparatus as defined in any one of the inventions 1 to 9, wherein the piezoelectric actuator sections each have a meandering structure in which a plurality of piezoelectric cantilevers are arranged so as to fold back in a meandering shape, and are driven in such a manner that mutually adjacent piezoelectric cantilevers perform a bending displacement in opposing directions.

According to this mode, it is possible to obtain a large displacement, even if resonance is not used.

(Invention 11): The mirror driving apparatus as defined in any one of the inventions 1 to 10, wherein the mirror section is resonantly driven in the vicinity of a resonance frequency fx of a resonance mode in which the mirror section performs a rotational motion about the axis of rotation.

According to this mode, it is possible to cause the mirror section to oscillate through a large angle of rotation using rotational resonance, as well as being able to suppress translational motion in the perpendicular direction.

(Invention 12): The mirror driving apparatus as defined in any one of the inventions 1 to 11, wherein a resonance frequency fy of a resonance mode in which the mirror section performs a translational motion in a direction perpendicular to the reflecting surface has a value higher than 200 Hz.

According to this mode, it is possible to suppress the induction of translational motion due to ambient vibrations. Furthermore, the higher the value of the resonance frequency fy of the translational mode, the smaller the amplitude of oscillation in the translational mode.

(Invention 13): In the mirror driving apparatus as defined in any one of Inventions 1 to 12, a ratio fy/fx between the resonance frequency fy of the translational motion of the mirror section and the resonance frequency fx of the rotational motion of the mirror section about the axis of rotation is no less than 1.1.

According to this mode, it is possible to suppress the induction of translational motion due to the effects of the drive frequency.

(Invention 14): The mirror driving apparatus as defined in any one of the inventions 1 to 13, wherein a ratio fy/fx between a resonance frequency fy of the translational motion of the mirror section and a resonance frequency fx of a rotational motion of the mirror section about the axis of rotation is no less than 2.0.

When fy satisfies the condition of no less than 2 times the fx, the differential between the drive frequency caused by the resonance driving and the resonance frequency of the translational mode, and therefore it is possible to suppress the induction of translational motion to a level which can be sufficiently ignored.

(Invention 15): The mirror driving apparatus as defined in any one of the inventions 1 to 14, wherein a piezoelectric body used in each of the piezoelectric actuator sections is a thin film which is directly formed onto a substrate serving as the diaphragm and has a thickness of 1 μm to 10 μm.

Desirably, a piezoelectric actuator is composed by using a thin film piezoelectric body. By using a direct film formation method, such as vapor phase epitaxy, typically sputtering, or sol gelation, it is possible to obtain a piezoelectric thin film having desired piezoelectric properties.

(Invention 16): The mirror driving apparatus as defined in the invention 15, wherein the piezoelectric body is a thin film formed by sputtering.

(Invention 17): The mirror driving apparatus as defined in any one of the inventions 1 to 16, wherein a piezoelectric body used in each of the piezoelectric actuator sections is one type or two or more types of perovskite oxide represented by Formula (P) below:

$$ABO_3(P) \qquad \text{General formula:}$$ 

(where A is an A site element and is at least one type of element including Pb; B is a B site element and is at least one type of element selected from the group consisting of Ti, Zr, V, Nb, Ta, Sb, Cr, Mo, W, Mn, Sc, Co, Cu, In, Sn, Ga, Zn, Cd, Fe and Ni; O is an oxygen element; and a standard molar ratio of the A-site element, the B-site element and the oxygen element is 1:1:3, but this molar ratio may deviate from the standard molar ratio within a range which enables a perovskite structure to be obtained.)

(Invention 18): The mirror driving apparatus as defined in any one of the inventions 1 to 17, wherein a piezoelectric body used in each of the piezoelectric actuator sections is one type or two or more types of perovskite oxide represented by Formula (PX) below:

$$A_a(Zr_x,Ti_y,M_{b-x-y})_b O_c \qquad (PX)$$ 

(where A is an A site element and is at least one type of element including Pb; M is at least one type of element selected from the group consisting of V, Nb, Ta and Sb; 0<x<b, 0<y<b, 0≤b−x−y; and a:b:c=1:1:3 is standard, but this molar ratio may deviate from the standard molar ratio within a range which enables a perovskite structure to be obtained.)

(Invention 19): A mirror driving method for the mirror driving apparatus as defined in any one of the inventions 1 to 18, comprising the step of: causing the connecting portions between the mirror section and the coupling sections to oscillate by applying a drive voltage to the pair of piezoelectric actuator sections so as to cause the piezoelectric actuator sections to perform a bending displacement, and then applying a rotational torque about the axis of rotation to the mirror section by this oscillation to cause the mirror section to be driven to rotate.

(Invention 20): A mirror driving method for the mirror driving apparatus as defined in the invention 10, comprising the steps of: applying a drive voltage to each of the plurality of piezoelectric cantilevers in the piezoelectric actuator sections each having the meandering structure, in such a manner that mutually adjacent piezoelectric cantilevers perform a bending displacement in opposing directions; and causing the mirror section to be driven to rotate non-resonantly by accumulation of the displacements of the plurality of piezoelectric cantilevers.

This mirror drive method is a mode which drives the piezoelectric actuator sections having a meandering piezoelectric cantilever structure.

(Invention 21): A method of manufacturing the mirror driving apparatus as defined in any one of the inventions 1 to 18, comprising the steps of: forming a lower electrode of each of the piezoelectric actuator sections on a SOI substrate; forming a piezoelectric thin film on the SOI substrate on which the lower electrode has been formed; forming an upper electrode on the piezoelectric thin film; and forming shapes of the mirror section, the coupling sections, the piezoelectric actuator sections, the perpendicular movement suppressing structure and the fixing section by processing the SOI substrate by a silicon dry etching process.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A mirror driving apparatus, comprising:
   a mirror section having a reflecting surface which reflects light;
   a pair of piezoelectric actuator sections arranged on either side of the mirror section;
   coupling sections which respectively connect one end of each of the piezoelectric actuator sections to an end portion of the mirror section which is distant from an axis of rotation of the mirror section in a direction along the reflecting surface and perpendicular to the axis of rotation;
   a fixing section which supports another end of each of the piezoelectric actuator sections,
   wherein, when the one end of each of the piezoelectric actuator sections is displaced, the displacement is transferred to the end section of the mirror section to rotate the mirror section, and the displacement of the piezoelectric actuator sections becomes larger with distance from the another end; and
   a perpendicular movement suppressing structure which suppresses translational motion of the axis of rotation of the mirror section in a direction perpendicular to the reflecting surface, one end of the perpendicular movement suppressing structure being connected to the fixing section and another end thereof being connected to the mirror section.

2. The mirror driving apparatus as defined in claim 1, wherein the perpendicular movement suppressing structure is a structure which connects the fixing section to a position on the mirror section that coincides with the axis of rotation, or to a plurality of positions on the mirror section that have axial symmetry with respect to the axis of rotation.

3. The mirror driving apparatus as defined in claim 1, wherein the perpendicular movement suppressing structure includes:
   a torsion bar which is connected to a position coinciding with the axis of rotation on the mirror section and which extends in an axial direction of the axis of rotation outwardly from the mirror section; and
   a torsion bar supporting section which is connected to the torsion bar and also connected to the fixing section and which supports the torsion bar.

4. The mirror driving apparatus as defined in claim 3, wherein the torsion bar supporting section has a thickness identical to that of the fixing section.

5. The mirror driving apparatus as defined in claim 3, wherein the torsion bar supporting section has a thin plate structure of which thickness is smaller than a thickness of the fixing section.

6. The mirror driving apparatus as defined in claim 1, wherein the coupling sections each have a structure in which at least one thin plate member having a direction perpendicular to the axis of rotation as its lengthwise direction is arranged so as to fold back in a meandering shape along the reflecting surface.

7. The mirror driving apparatus as defined in claim 1, wherein the piezoelectric actuator sections are each constituted by one or a plurality of piezoelectric cantilevers.

8. The mirror driving apparatus as defined in claim 1, wherein the piezoelectric actuator sections are each constituted by a piezoelectric unimorph cantilever in which a diaphragm, a lower electrode, a piezoelectric body and an upper electrode are successively layered.

9. The mirror driving apparatus as defined in claim 1, wherein connecting portions between the mirror section and the coupling sections are caused to oscillate by displacing the piezoelectric actuator sections so as to induce a rotational motion of the mirror section about the axis of rotation.

10. The mirror driving apparatus as defined in claim 1, wherein the piezoelectric actuator sections each have a meandering structure in which a plurality of piezoelectric cantilevers are arranged so as to fold back in a meandering shape, and are driven in such a manner that the piezoelectric cantilevers mutually adjacent in the direction of the axis of rotation perform a bending displacement in opposing directions.

11. The mirror driving apparatus as defined in claim 1, wherein the mirror section is resonantly driven in the vicinity of a resonance frequency fx of a resonance mode in which the mirror section performs a rotational motion about the axis of rotation.

12. The mirror driving apparatus as defined in claim 1, wherein a resonance frequency fy of a resonance mode in which the mirror section performs a translational motion in a direction perpendicular to the reflecting surface has a value higher than 200 Hz.

13. The mirror driving apparatus as defined in claim 1, wherein a ratio fy/fx between a resonance frequency fy of the translational motion of the mirror section and a resonance frequency fx of a rotational motion of the mirror section about the axis of rotation is no less than 1.1.

14. The mirror driving apparatus as defined in claim 1, wherein a ratio fy/fx between a resonance frequency fy of the translational motion of the mirror section and a resonance frequency fx of a rotational motion of the mirror section about the axis of rotation is no less than 2.0.

15. The mirror driving apparatus as defined in claim 1, wherein a piezoelectric body used in each of the piezoelectric actuator sections is a thin film which is directly formed onto a substrate serving as the diaphragm and has a thickness of 1 μm to 10 μm.

16. The mirror driving apparatus as defined in claim 15, wherein the piezoelectric body is a thin film formed by sputtering.

17. The mirror driving apparatus as defined in claim 1, wherein a piezoelectric body used in each of the piezoelectric actuator sections is one type or two or more types of perovskite oxide represented by Formula (P) below:

$$ABO_3 \qquad (P)$$
General formula:

(where A is an A site element and is at least one type of element including Pb; B is a B site element and is at least one type of element selected from the group consisting of Ti, Zr, V, Nb, Ta, Sb, Cr, Mo, W, Mn, Sc, Co, Cu, In, Sn, Ga, Zn, Cd, Fe and Ni; O is an oxygen element; and a standard molar ratio of the A-site element, the B-site element and the oxygen element is 1:1:3, but this molar ratio may deviate from the standard molar ratio within a range which enables a perovskite structure to be obtained.)

18. The mirror driving apparatus as defined in claim 1, wherein a piezoelectric body used in each of the piezoelectric actuator sections is one type or two or more types of perovskite oxide represented by Formula (PX) below:

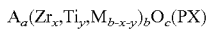

$$A_a(Zr_x, Ti_y, M_{b-x-y})_b O_c (PX)$$

(where A is an A site element and is at least one type of element including Pb; M is at least one type of element selected from the group consisting of V, Nb, Ta and Sb; $0<x<b$, $0<y<b$, $0\leq b-x-y$; and a:b:c=1:1:3 is standard, but this molar ratio may deviate from the standard molar ratio within a range which enables a perovskite structure to be obtained.)

19. A mirror driving method for the mirror driving apparatus as defined in claim 1, comprising:
causing the connecting portions between the mirror section and the coupling sections to oscillate by applying a drive voltage to the pair of piezoelectric actuator sections so as to cause the piezoelectric actuator sections to perform a bending displacement, wherein, when the one end of each of the piezoelectric actuator sections is displaced, the displacement is transferred to the end section of the mirror section to rotate the mirror section, and the displacement of the piezoelectric actuator sections becomes larger with distance from the another end; and
then applying a rotational torque about the axis of rotation to the mirror section by this oscillation to cause the mirror section to be driven to rotate.

20. A mirror driving method for the mirror driving apparatus as defined in claim 10, comprising:
applying a drive voltage to each of the plurality of piezoelectric cantilevers in the piezoelectric actuator sections each having the meandering structure, in such a manner that the piezoelectric cantilevers mutually adjacent in the direction of the axis of rotation perform a bending displacement in opposing directions,
wherein, when the one end of each of the piezoelectric actuator sections is displaced, the displacement is transferred to the end section of the mirror section to rotate the mirror section, and the displacement of the piezoelectric actuator sections becomes larger with distance from the another end; and
causing the mirror section to be driven to rotate non-resonantly by accumulation of the displacements of the plurality of piezoelectric cantilevers.

21. A method of manufacturing the mirror driving apparatus as defined in claim 1, comprising:
forming a lower electrode of each of the piezoelectric actuator sections on a SOI substrate;
forming a piezoelectric thin film on the SOI substrate on which the lower electrode has been formed;
forming an upper electrode on the piezoelectric thin film; and
forming shapes of the mirror section, the coupling sections, the piezoelectric actuator sections, the perpendicular movement suppressing structure and the fixing section by processing the SOI substrate by a silicon dry etching process.

* * * * *